United States Patent
Xing

(10) Patent No.: US 11,398,877 B2
(45) Date of Patent: Jul. 26, 2022

(54) CHANNEL STATE INFORMATION MEASUREMENT METHOD AND APPARATUS

(71) Applicant: HUAWEI TECHNOLOGIES CO., LTD., Guangdong (CN)

(72) Inventor: Zhihao Xing, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/394,480

(22) Filed: Apr. 25, 2019

(65) Prior Publication Data
US 2019/0253184 A1 Aug. 15, 2019

Related U.S. Application Data

(63) Continuation of application No. PCT/CN2017/092657, filed on Jul. 12, 2017.

(30) Foreign Application Priority Data

Oct. 25, 2016 (CN) .......................... 201610938396.3

(51) Int. Cl.
*H04W 80/10* (2009.01)
*H04L 1/00* (2006.01)
(Continued)

(52) U.S. Cl.
CPC ............. *H04L 1/0026* (2013.01); *H04B 7/06* (2013.01); *H04L 1/0061* (2013.01); *H04L 1/06* (2013.01);
(Continued)

(58) Field of Classification Search
CPC . H04L 25/0228; H04L 5/0055; H04L 1/0026; H04L 5/00; H04W 24/10;
(Continued)

(56) References Cited

U.S. PATENT DOCUMENTS

2008/0095268 A1* 4/2008 Aldana ................. H04L 1/0656
375/299
2008/0267133 A1* 10/2008 Shida ................... H04B 7/0874
370/334
(Continued)

FOREIGN PATENT DOCUMENTS

| CN | 101212282 A | 7/2008 |
|----|-------------|--------|
| CN | 102149130 A | 8/2011 |

(Continued)

OTHER PUBLICATIONS

Extended European Search Report issued in European Application No. 17865341.6 dated Sep. 4, 2019, 8 pages.
(Continued)

*Primary Examiner* — Wutchung Chu
*Assistant Examiner* — Jason A Harley
(74) *Attorney, Agent, or Firm* — Fish & Richardson P.C.

(57) ABSTRACT

This application relates to the field of communications technologies, and provides a channel state information measurement method and apparatus, so that a receiver can measure CSI without joining a network of a WiFi transmitter. The method includes: sending, by a CSI request apparatus, a first CREQ frame, a group of session parameters used to transmit a CS frame; receiving, by the CSI request apparatus, a CRSP frame sent by a first CSI response apparatus; receiving, by the CSI request apparatus, the CS frame by using the first session parameter; and measuring, by the CSI request apparatus, the CS frame to obtain CSI. The method is applied to a scenario of positioning or a scenario in which CSI measurement needs to be customized.

40 Claims, 15 Drawing Sheets

(a) CS frame in a NON-HT format (b) CS frame in an HT-GF format (c) CS frame in an HT-MF format (d) CS frame in a VHT format

(51) Int. Cl.
| | |
|---|---|
| *H04W 72/04* | (2009.01) |
| *H04B 7/02* | (2018.01) |
| *H04B 7/0452* | (2017.01) |
| *H04B 7/04* | (2017.01) |
| *H04L 5/00* | (2006.01) |
| *H04W 24/10* | (2009.01) |
| *H04L 1/06* | (2006.01) |
| *H04L 25/02* | (2006.01) |
| *H04B 7/06* | (2006.01) |

(52) U.S. Cl.
CPC ............ *H04L 5/00* (2013.01); *H04L 25/0228* (2013.01); *H04W 24/10* (2013.01); *H04W 72/0446* (2013.01); *H04W 80/10* (2013.01)

(58) Field of Classification Search
CPC ... H04W 80/10; H04B 7/0626; H04B 7/0691; H04B 7/06
USPC .................................................. 370/332, 470
See application file for complete search history.

(56) References Cited

U.S. PATENT DOCUMENTS

| | | | |
|---|---|---|---|
| 2012/0127899 A1 | 5/2012 | Ketchum et al. | |
| 2012/0243485 A1 | 9/2012 | Merlin et al. | |
| 2013/0044707 A1 | 2/2013 | Chen et al. | |
| 2013/0058310 A1* | 3/2013 | Park .................... | H04W 72/082 370/331 |
| 2013/0235756 A1* | 9/2013 | Seo ........................ | H04L 1/003 370/252 |
| 2013/0258886 A1 | 10/2013 | Chen et al. | |
| 2014/0056272 A1 | 2/2014 | Gao et al. | |
| 2014/0204891 A1* | 7/2014 | Park ...................... | H04W 72/02 370/329 |
| 2015/0003271 A1 | 1/2015 | Park et al. | |
| 2015/0282184 A1* | 10/2015 | Yang .................... | H04L 1/0009 455/513 |
| 2015/0289279 A1* | 10/2015 | Xu .................... | H04W 72/0486 370/329 |
| 2015/0311964 A1 | 10/2015 | Sohn et al. | |
| 2016/0135148 A1* | 5/2016 | Novlan ................... | H04L 5/006 370/329 |
| 2016/0135185 A1* | 5/2016 | Chandrasekhar ..... | H04W 16/14 370/329 |
| 2016/0262050 A1* | 9/2016 | Merlin .................. | H04L 5/0048 |
| 2016/0270060 A1* | 9/2016 | Kusashima ........... | H04L 5/1415 |
| 2017/0019163 A1* | 1/2017 | Yoshimoto ................ | H04L 1/00 |
| 2017/0041927 A1* | 2/2017 | Jeong ................ | H04W 74/0816 |
| 2018/0176809 A1 | 6/2018 | Gao | |
| 2018/0184473 A1* | 6/2018 | Park ...................... | H04W 76/15 |
| 2018/0359761 A1 | 12/2018 | Chun et al. | |

FOREIGN PATENT DOCUMENTS

| | | |
|---|---|---|
| CN | 102340801 A | 2/2012 |
| CN | 103023589 A | 4/2013 |
| CN | 103119982 A | 5/2013 |
| CN | 103202085 A | 7/2013 |
| CN | 103516464 A | 1/2014 |
| CN | 103840907 A | 6/2014 |
| CN | 104284424 A | 1/2015 |
| CN | 104812061 A | 7/2015 |
| EP | 2760153 A2 | 7/2014 |
| EP | 2925042 A1 | 9/2015 |
| WO | 2011115421 A2 | 9/2011 |
| WO | 2013109110 A1 | 7/2013 |
| WO | 2016167609 A1 | 10/2016 |

OTHER PUBLICATIONS

Office Action issued in Chinese Application No. 201610938396.3 dated Dec. 4, 2019, 10 pages.
[No Author] [online], "Linux 802. 11n CSI Tool," [retrieved on Jun. 11, 2019], retrieved from: URL<http://dhalperi.github.io/linux-80211n-csitool/>, 21 pages.
IEEE Std 802.11-2012, "Part 11 Wireless LAN Medium Access Control (MAC) and Physical Layer (PHY) Specifications," IEEE Computer Society, Mar. 29. 2012, 2793 pages.
IEEE Std. 802.11ac-2013, "Part 11:Wireless LAN Medium Access Control (MAC) and Physical Layer (PHY) Specifications; Amendment 4: Enhancements for Very High Throughput for Operation in Bands below 6 GHz," IEEE Computer Society, Dec. 11, 2013, 425 pages.
PCT International Search Report and Written Opinion issued in International Application No. PCT/CN2017/092657 dated Sep. 26, 2017, 20 pages (with English translation).
EPO Communication pursuant to Article 94(3) EPC issued in European Application No. 17865341.6 dated Feb. 2, 2021, 7 pages.

\* cited by examiner (a) CS frame in a NON-HT format (b) CS frame in an HT-GF format (c) CS frame in an HT-MF format (d) CS frame in a VHT format (a) VHT-LTF structure when $N_{tx} \leq 4$

TO FIG. 6B

CONT. FROM FIG. 6A

Six transmit antennas

← Five transmit antennas

| | | | | | | |
|---|---|---|---|---|---|---|
| Transmit antenna 1 | 1*VHT-LTF | -1*VHT-LTF | 1*VHT-LTF | 1*VHT-LTF | 1*VHT-LTF | -1*VHT-LTF |
| Transmit antenna 2 | 1*VHT-LTF | $-w^1$*VHT-LTF | $w^2$*VHT-LTF | $w^3$*VHT-LTF | $w^4$*VHT-LTF | $-w^5$*VHT-LTF |
| Transmit antenna 3 | 1*VHT-LTF | $-w^2$*VHT-LTF | $w^4$*VHT-LTF | $w^6$*VHT-LTF | $w^8$*VHT-LTF | $-w^{10}$*VHT-LTF |
| Transmit antenna 4 | 1*VHT-LTF | $-w^3$*VHT-LTF | $w^6$*VHT-LTF | $w^9$*VHT-LTF | $w^{12}$*VHT-LTF | $-w^{15}$*VHT-LTF |
| Transmit antenna 5 | 1*VHT-LTF | $-w^4$*VHT-LTF | $w^8$*VHT-LTF | $w^{12}$*VHT-LTF | $w^{16}$*VHT-LTF | $-w^{20}$*VHT-LTF |
| Transmit antenna 6 | 1*VHT-LTF | $-w^5$*VHT-LTF | $w^{10}$*VHT-LTF | $w^{15}$*VHT-LTF | $w^{20}$*VHT-LTF | $-w^{25}$*VHT-LTF |

$w = \exp(-j2\pi/6)$ (b) VHT-LTF structure when $N_{tx}=5$, and $N_{tx}=6$

CONT. FROM FIG. 6B

| Transmit antenna | | | | | | | | |
|---|---|---|---|---|---|---|---|---|
| Transmit antenna 1 | 1*VHT-LTF | −1*VHT-LTF | 1*VHT-LTF | 1*VHT-LTF | 1*VHT-LTF | −1*VHT-LTF | 1*VHT-LTF | 1*VHT-LTF |
| Transmit antenna 2 | 1*VHT-LTF | 1*VHT-LTF | 1*VHT-LTF | 1*VHT-LTF | −1*VHT-LTF | 1*VHT-LTF | −1*VHT-LTF | 1*VHT-LTF |
| Transmit antenna 3 | 1*VHT-LTF | 1*VHT-LTF | −1*VHT-LTF | 1*VHT-LTF | 1*VHT-LTF | 1*VHT-LTF | 1*VHT-LTF | −1*VHT-LTF |
| Transmit antenna 4 | −1*VHT-LTF | 1*VHT-LTF | 1*VHT-LTF | 1*VHT-LTF | −1*VHT-LTF | −1*VHT-LTF | 1*VHT-LTF | 1*VHT-LTF |
| Transmit antenna 5 | 1*VHT-LTF | −1*VHT-LTF | 1*VHT-LTF | 1*VHT-LTF | 1*VHT-LTF | 1*VHT-LTF | −1*VHT-LTF | −1*VHT-LTF |
| Transmit antenna 6 | 1*VHT-LTF | 1*VHT-LTF | 1*VHT-LTF | −1*VHT-LTF | 1*VHT-LTF | −1*VHT-LTF | 1*VHT-LTF | −1*VHT-LTF |
| Transmit antenna 7 | 1*VHT-LTF | 1*VHT-LTF | 1*VHT-LTF | −1*VHT-LTF | −1*VHT-LTF | 1*VHT-LTF | 1*VHT-LTF | 1*VHT-LTF |
| Transmit antenna 8 | −1*VHT-LTF | 1*VHT-LTF | −1*VHT-LTF | −1*VHT-LTF | 1*VHT-LTF | −1*VHT-LTF | −1*VHT-LTF | −1*VHT-LTF |

← Seven transmit antennas

← Eight transmit antennas (c) VHT-LTF structure when $N_{tx}=7$, and $N_{tx}=8$

FIG. 6C

CHANNEL STATE INFORMATION MEASUREMENT METHOD AND APPARATUS

CROSS-REFERENCE TO RELATED APPLICATIONS

This application is a continuation of International Application No. PCT/CN2017/092657, filed on Jul. 12, 2017, which claims priority to Chinese Patent Application No. 201610938396.3, filed on Oct. 25, 2016, The disclosures of the aforementioned applications are hereby incorporated by reference in their entireties.

TECHNICAL FIELD

This application relates to the field of communications technologies, and in particular, to a channel state information (Channel State Information, CSI) measurement method and apparatus.

BACKGROUND

In the 802.11 standards, when a WiFi (wireless fidelity, Wireless Fidelity) transmitter performs an operation of transmit beamforming, CSI of a multiple-input multiple-output (Multiple Input Multiple Output, MIMO) transmission channel from the WiFi transmitter to a receiver needs to be obtained. For example, in an explicit feedback mechanism, the WiFi transmitter sends a channel sounding packet to the receiver. After receiving the sounding packet, the receiver obtains CSI of the channel used by the WiFi transmitter to send a data packet to the receiver, and then sends the obtained CSI to the WiFi transmitter by using a CSI feedback packet. The WiFi transmitter then calculates a beamforming steering matrix according to the CSI, to perform transmit beamforming.

At present, because CSI can reflect changes of amplitude and a phase of a radio signal after the radio signal has gone through one or a combination of stages such as straight-line propagation, reflection, scattering, and diffraction on a transmission channel, that is, a frequency domain response and a time domain response of the radio signal after the radio signal has gone through a propagation channel, the CSI is also applicable to the field of indoor positioning, and excellent positioning performance can be achieved.

However, because an existing CSI measurement method is used to serve a beamforming mechanism, a receiver needs to join a WiFi network of a WiFi transmitter to measure CSI between the receiver and the WiFi transmitter. That is, the receiver needs to undergo a "scanning, authentication, and association" process and enable a high throughput mode for communication with the WiFi transmitter before CSI can be measured. The transmitter needs to periodically obtain CSI between the transmitter and multiple WiFi transmitters to perform positioning. Therefore, when the transmitter only needs to use CSI to perform indoor positioning, the receiver needs to sequentially join multiple WiFi networks to measure CSI between the receiver and the multiple WiFi transmitters. In this process of repeatedly joining and leaving WiFi networks, extra bandwidth overheads of transmitters and an extra time delay are caused during positioning.

SUMMARY

Embodiments of the present invention provide a CSI measurement method and apparatus, so that a receiver can measure CSI without joining a network of a WiFi transmitter, thereby reducing bandwidth overheads and a time delay.

To achieve the foregoing objective, the following technical solutions are used in the embodiments of the present invention.

According to a first aspect, an embodiment of the present invention provides a CSI measurement method. The method includes: sending, by a CSI request apparatus, a first channel state information request frame (CSI Request Frame, CREQ frame), where the first CREQ frame includes at least one group of session parameters that the CSI request apparatus expects to use, the first CREQ frame is used to request a CSI response apparatus that receives the first CREQ frame to determine, in the at least one group of session parameters, a group of session parameters used to transmit a channel state information sounding frame (CSI Sounding Frame, CS frame), and the CS frame is used by the CSI request apparatus to perform channel state measurement; receiving, by the CSI request apparatus, a channel state information response frame (CSI Response Frame, CRSP frame) sent by a first CSI response apparatus, where the CRSP frame includes a first session parameter, the first CSI response apparatus is a CSI response apparatus that receives the first CREQ frame, the first session parameter is a group of session parameters that is of the at least one group of session parameters and that can be satisfied by a capability parameter of the first CSI response apparatus, and the CRSP frame is used to instruct the CSI request apparatus to receive, by using the first session parameter, the CS frame sent by the first CSI response apparatus; receiving, by the CSI request apparatus by using the first session parameter, the CS frame sent by the first CSI response apparatus; and measuring, by the CSI request apparatus, the CS frame to obtain CSI.

Based on the CSI measurement method provided in this embodiment of the present invention, when the CSI request apparatus needs to obtain CSI between the CSI request apparatus and the first CSI response apparatus, the CSI request apparatus may negotiate session parameters with the first CSI response apparatus by using the first CREQ frame and the CRSP frame, determine the first session parameter that the CSI request apparatus expects to use and that can be satisfied by the capability parameter of the first CSI response apparatus, and transmit the CS frame by using the first session parameter, so that the CSI request apparatus can measure the CS frame to obtain the CSI. In a process of obtaining the CSI, the CSI request apparatus does not need to join a network of the first CSI response apparatus. Therefore, bandwidth overheads of the CSI request apparatus and the first CSI response apparatus are reduced, and a time delay of obtaining the CSI by the CSI request apparatus is reduced.

In a possible design, the CS frame may directly use a null data packet NDP corresponding to a physical-layer protocol data unit (Physical-layer Protocol Data Unit, PPDU) format included in the first session parameter; and the measuring, by the CSI request apparatus, the CS frame to obtain CSI includes: measuring, by the CSI request apparatus, a preamble sequence of the CS frame to obtain the CSI.

In a possible design, before a CSI measurement session defined in the first session parameter ends, the method further includes: sending, by the CSI request apparatus, a second CREQ frame to the first CSI response apparatus, where the second CREQ frame is used to instruct the first CSI response apparatus to terminate a current CSI measurement session and stop sending the CS frame.

By means of this possible design, when the CSI request apparatus stops measuring the CSI between the CSI request apparatus and the first CSI response apparatus, the CSI request apparatus can instruct the first CSI response apparatus in time by using the second CREQ frame to terminate the current CSI measurement session, thereby reducing power consumption of the first CSI response apparatus and saving transmission resources of the first CSI response apparatus.

In a possible design, the sending, by a CSI request apparatus, a first CREQ frame includes: sending, by the CSI request apparatus, the first CREQ frame to the first CSI response apparatus.

In a possible design, before the sending, by the CSI request apparatus, the first CREQ frame to the first CSI response apparatus, the method further includes: receiving, by the CSI request apparatus, a broadcast frame broadcast by the first CSI response apparatus, where the broadcast frame includes CSI responder capability indication information, and the CSI responder capability indication information is used to indicate that the first CSI response apparatus has a capability of sending the CS frame; and the sending, by the CSI request apparatus, the first CREQ frame to the first CSI response apparatus includes: after the CSI request apparatus determines, according to the CSI responder capability indication information, that the first CSI response apparatus has the capability of sending the CS frame, sending, by the CSI request apparatus, the first CREQ frame to the first CSI response apparatus.

By means of this possible design, the CSI request apparatus can determine, by using the CSI responder capability indication information carried in the received broadcast frame, which 802.11 STA device or AP device is a first CSI response apparatus that has a CSI responder capability, thereby preventing the CSI request apparatus from sending the first CREQ frame to a STA device or an AP device that does not have the CSI responder capability, so as to reduce bandwidth overheads of the CSI request apparatus and a time delay of obtaining the CSI by the CSI request apparatus.

In a possible design, the broadcast frame further includes a CSI responder capability CRC information element, where the CRC information element carries one or more capability parameters of a PPDU format supported by the first CSI response apparatus, a transmission bandwidth, a modulation and coding scheme, or a quantity of transmit antennas or transmit antenna arrangement information of the first CSI response apparatus; and before the sending, by the CSI request apparatus, the first CREQ frame to the first CSI response apparatus, the method further includes: determining, by the CSI request apparatus, the at least one group of session parameters according to the capability parameter of the first CSI response apparatus.

By means of this possible design, the CSI request apparatus can determine, according to the capability parameter of the first CSI response apparatus, the at least one group of session parameters that the CSI request apparatus expects to use, thereby improving a probability that the first CSI response apparatus successfully responds to a request of the first CREQ frame.

In a possible design, before the sending, by the CSI request apparatus, the first CREQ frame to the first CSI response apparatus, the method further includes: if the CSI request apparatus receives broadcast frames broadcast by multiple CSI response apparatuses, determining, by the CSI request apparatus in the multiple CSI response apparatuses according to CRC information elements of the multiple CSI response apparatuses, at least one first CSI response apparatus whose capability parameter satisfies a requirement of the CSI request apparatus for transmitting the CS frame.

In this possible design, the at least one first CSI response apparatus whose capability parameter satisfies the requirement of the CSI request apparatus for transmitting the CS frame may be selected, and CSI between the CSI request apparatus and the at least one first CSI response apparatus is measured, thereby improving precision of obtained CSI.

In a possible design, before the sending, by a CSI request apparatus, a first CREQ frame, the method further includes: obtaining, by the CSI request apparatus, a channel list, where the channel list is used to indicate at least one channel, and the at least one channel is used by the CSI request apparatus to broadcast the first CREQ frame; and the sending, by a CSI request apparatus, a first CREQ frame includes: broadcasting, by the CSI request apparatus, the first CREQ frame on the at least one channel.

In a possible design, after the receiving, by the CSI request apparatus, a CRSP frame sent by a first CSI response apparatus, and before the receiving, by the CSI request apparatus, the CS frame by using the first session parameter, the method further includes: sending, by the CSI request apparatus, a third CREQ frame to the first CSI response apparatus, where the third CREQ frame is used to request the first CSI response apparatus to start to periodically send the CS frame within a current burst period.

In a possible design, if the CSI request apparatus receives CRSP frames sent by multiple CSI response apparatuses, before the sending, by the CSI request apparatus, a third CREQ frame to the first CSI response apparatus, the method further includes: determining, by the CSI request apparatus, at least one first CSI response apparatus in the multiple CSI response apparatuses according to expected values for session parameters selected by the multiple CSI response apparatuses.

According to a second aspect, an embodiment of the present invention provides a CSI measurement method. The method includes: receiving, by a first CSI response apparatus, a first CREQ frame sent by a CSI request apparatus, where the first CREQ frame includes at least one group of session parameters that the CSI request apparatus expects to use, the first CREQ frame is used to request the first CSI response apparatus to determine, in the at least one group of session parameters, a group of session parameters used to transmit a CS frame, and the CS frame is used by the CSI request apparatus to perform channel state sounding; determining, by the first CSI response apparatus, a first session parameter that is in the at least one group of session parameters and that can be satisfied by a capability parameter of the first CSI response apparatus; sending, by the first CSI response apparatus, a CRSP frame to the CSI request apparatus, where the CRSP frame includes the first session parameter, and the CRSP frame is used to instruct the CSI request apparatus to receive the CS frame by using the first session parameter; and sending, by the first CSI response apparatus, the CS frame by using the first session parameter.

Based on the CSI measurement method provided in this embodiment of the present invention, when the CSI request apparatus needs to obtain CSI between the CSI request apparatus and the first CSI response apparatus, the first CSI response apparatus may negotiate session parameters with the CSI request apparatus by using the first CREQ frame and the CRSP frame, determine the first session parameter that is in the at least one group of session parameters that the CSI request apparatus expects to use and that can be satisfied by the capability parameter of the first CSI response apparatus, and transmit the CS frame by using the first session parameter, so that the CSI request apparatus can measure the CS frame to obtain the CSI. In a process of obtaining the CSI, the CSI request apparatus does not need to join a network of the first CSI response apparatus. Therefore, bandwidth overheads of the CSI request apparatus and the first CSI response apparatus are reduced, and a time delay of obtaining the CSI by the CSI request apparatus is reduced.

In a possible design, after the sending, by the first CSI response apparatus, the CS frame by using the first session parameter, the method further includes: receiving, by the first CSI response apparatus, a second CREQ frame sent by the CSI request apparatus, where the second CREQ frame is used to instruct the first CSI response apparatus to terminate a current CSI measurement session and stop sending the CS frame; and according to the second CREQ frame, terminating, by the first CSI response apparatus, the current CSI measurement session and stopping sending the CS frame.

By means of this possible design, when the CSI request apparatus stops measuring the CSI between the CSI request apparatus and the first CSI response apparatus, the first CSI response apparatus can stop in time, according to the second CREQ frame sent by the CSI request apparatus, sending the CS frame, thereby reducing power consumption of the first CSI response apparatus and saving transmission resources of the first CSI response apparatus.

In a possible design, the receiving, by a first CSI response apparatus, a first CREQ frame sent by a CSI request apparatus includes: receiving, by the first CSI response apparatus by using a unicast manner, the first CREQ frame sent by the CSI request apparatus.

In a possible design, before the receiving, by a first CSI response apparatus, a first CREQ frame sent by a CSI request apparatus, the method further includes: sending, by the first CSI response apparatus, a broadcast frame, where the broadcast frame includes CSI responder capability indication information, and the CSI responder capability indication information is used to indicate that the first CSI response apparatus has a CSI responder capability.

By means of this possible design, the first CSI response apparatus can advertise, by using the broadcast frame carrying the CSI response apparatus capability indication information, that the first CSI response apparatus has the CSI responder capability, so that when detecting multiple 802.11 STA devices or AP devices, the CSI request apparatus can select, from the multiple STA devices or AP devices according to the first CSI response apparatus capability indication information, the first CSI response apparatus that has the CSI responder capability, thereby preventing the CSI request apparatus from sending the first CREQ frame to a STA device or an AP device that does not have the CSI responder capability, so as to reduce bandwidth overheads of the CSI request apparatus and reduce a time delay of obtaining the CSI by the CSI request apparatus.

In a possible design, the broadcast frame further includes a CSI responder capability CRC information element, where the CRC information element is used to carry the capability parameter of the first CSI response apparatus, to enable the CSI request apparatus that receives the broadcast frame to learn the capability parameter.

In a possible design, if the first CSI response apparatus determines that a session parameter that can satisfy the capability parameter does not exist in the at least one group of session parameters, a CRSP carries failure indication information, where the failure indication information is used to indicate that a request of the first CREQ frame fails.

In a possible design, after the sending, by the first CSI response apparatus, a CRSP frame to the CSI request apparatus, and before the sending, by the first CSI response apparatus, the CS frame by using the first session parameter, the method further includes: receiving, by the first CSI response apparatus, a third CREQ frame sent by the CSI request apparatus, where the third CREQ frame is used to request the first CSI response apparatus to start to periodically send the CS frame within a current burst period; and the sending, by the first CSI response apparatus, the CS frame by using the first session parameter includes: sending, by the first CSI response apparatus, the CS frame according to an indication of the third CREQ frame and by using the first session parameter.

According to a third aspect, an embodiment of the present invention provides a CSI request apparatus, including: a sending unit, configured to send a first CREQ frame, where the first CREQ frame includes at least one group of session parameters that the CSI request apparatus expects to use, the first CREQ frame is used to request a CSI response apparatus that receives the first CREQ frame to determine, in the at least one group of session parameters, a group of session parameters used to transmit a CS frame, and the CS frame is used by a measurement unit to perform channel state measurement; a receiving unit, configured to receive a CRSP frame sent by a first CSI response apparatus, where the CRSP frame includes a first session parameter, the first CSI response apparatus is a CSI response apparatus that receives the first CREQ frame, the first session parameter is a group of session parameters that is of the at least one group of session parameters and that can be satisfied by a capability parameter of the first CSI response apparatus, and the CRSP frame is used to instruct the receiving unit to receive, by using the first session parameter, the CS frame sent by the first CSI response apparatus, where the receiving unit is further configured to receive, by using the first session parameter, the CS frame sent by the first CSI response apparatus; and the receiving unit is further configured to receive a CS leading CSL frame that is sent by the first CSI response apparatus before the CS frame and that has a time interval being a short interframe space SIFS from the CS frame, where the CSL frame includes a sender address and a receiver address of the CS frame; and the measurement unit, configured to measure the CS frame to obtain CSI.

In a possible design, each group of session parameters of the at least one group of session parameters sent by the sending unit includes a transmission parameter and a scheduling parameter; the transmission parameter includes one or more parameters of a physical-layer protocol data unit PPDU format of the CS frame, or channel information, a transmission bandwidth, a modulation and coding scheme, or a quantity of transmit antennas or a set of transmit antennas used during transmission of the CS frame; and the scheduling parameter includes a burst period of sending the CS frame, a quantity of burst periods, a busy period of sending the CS frame within the burst period, and a time interval of sending the CS frame in the busy period.

In a possible design, the CS frame received by the receiving unit may use a null data packet NDP corresponding to the PPDU format included in the first session parameter; and the measurement unit is configured to measure a preamble sequence of the CS frame to obtain the CSI.

In a possible design, the sending unit is further configured to: before a CSI measurement session defined in the first session parameter ends, send a second CREQ frame to the first CSI response apparatus, where the second CREQ frame is used to instruct the first CSI response apparatus to terminate a current CSI measurement session and stop sending the CS frame.

In a possible design, the sending, by the sending unit, the first CREQ frame includes: sending the first CREQ frame to the first CSI response apparatus.

In a possible design, the receiving unit is further configured to: before the sending unit sends the first CREQ frame to the first CSI response apparatus, receive a broadcast frame broadcast by the first CSI response apparatus, where the broadcast frame includes CSI responder capability indication information, and the CSI responder capability indication information is used to indicate that the first CSI response apparatus has a capability of sending the CS frame; and the sending, by the sending unit, the first CREQ frame to the first CSI response apparatus y includes: after it is determined, according to the CSI responder capability indication information, that the first CSI response apparatus has the capability of sending the CS frame, sending the first CREQ frame to the first CSI response apparatus.

In a possible design, the CSI request apparatus further includes a determining unit; the broadcast frame received by the receiving unit further includes a CSI responder capability CRC information element, where the CRC information element carries one or more capability parameters of a PPDU format supported by the first CSI response apparatus, a transmission bandwidth, a modulation and coding scheme, or a quantity of transmit antennas or transmit antenna arrangement information of the first CSI response apparatus; and the determining unit is configured to: before the sending unit sends the first CREQ frame to the first CSI response apparatus, determine the at least one group of session parameters according to the capability parameter of the first CSI response apparatus received by the receiving unit.

In a possible design, the determining unit is further configured to: before the sending unit sends the first CREQ frame to the first CSI response apparatus, if the receiving unit receives broadcast frames broadcast by multiple CSI response apparatuses, determine, in the multiple CSI response apparatuses according to CRC information elements of the multiple CSI response apparatuses, at least one first CSI response apparatus whose capability parameter satisfies a requirement of the CSI request apparatus for transmitting the CS frame.

In a possible design, the CSI request apparatus further includes an obtaining unit; the obtaining unit is configured to: before the sending unit sends the first CREQ frame, obtain a channel list, where the channel list is used to indicate at least one channel, and the at least one channel is used to broadcast the first CREQ frame by the sending unit; and the sending, by the sending unit, the first CREQ frame y includes: broadcasting the first CREQ frame on the at least one channel.

In a possible design, the sending unit is further configured to: after the receiving unit receives the CRSP frame sent by the first CSI response apparatus and before the receiving unit receives the CS frame by using the first session parameter, send a third CREQ frame to the first CSI response apparatus, where the third CREQ frame is used to request the first CSI response apparatus to start to periodically send the CS frame within a current burst period.

In a possible design, the CSI request apparatus further includes a determining unit; the determining unit is configured to: if the receiving unit receives CRSP frames sent by multiple CSI response apparatuses, before the sending unit sends the third CREQ frame to the first CSI response apparatus, determine at least one first CSI response apparatus in the multiple CSI response apparatuses according to expected values of the CSI request apparatus for session parameters selected by the multiple CSI response apparatuses.

For the technical effect of the CSI request apparatus provided in this embodiment of the present invention, refer to technical effects of the second aspect or various optional manners in the second aspect, and details are not described herein.

According to a fourth aspect, an embodiment of the present invention provides a CSI response apparatus, including: a receiving unit, configured to receive a first CREQ frame sent by a CSI request apparatus, where the first CREQ frame includes at least one group of session parameters that the CSI request apparatus expects to use, the first CREQ frame is used to request a determining unit to determine, in the at least one group of session parameters, a group of session parameters used to transmit a CS frame, and the CS frame is used by the CSI request apparatus to perform channel state sounding; the determining unit, configured to determine a first session parameter that is in the at least one group of session parameters received by the receiving unit and that can be satisfied by a capability parameter of the CSI response apparatus; and a sending unit, configured to send a CRSP frame to the CSI request apparatus, where the CRSP frame includes the first session parameter determined by the determining unit, and the CRSP frame is used to instruct the CSI request apparatus to receive the CS frame by using the first session parameter, where the sending unit is further configured to send the CS frame by using the first session parameter; and the sending unit is further configured to: before the CS frame is sent each time, send a CS advertisement CA frame a SIFS time earlier, where the CA frame includes a MAC address of the first CSI response apparatus.

In a possible design, each group of session parameters of the at least one group of session parameters received by the receiving unit includes a transmission parameter and a scheduling parameter; the transmission parameter includes one or more parameters of a physical-layer protocol data unit PPDU format of the CS frame, or channel information, a transmission bandwidth, a modulation and coding scheme, or a quantity of transmit antennas or a set of transmit antennas used during transmission of the CS frame; and the scheduling parameter includes a burst period of sending the CS frame, a quantity of burst periods, a busy period of sending the CS frame within the burst period, and a time interval of sending the CS frame in the busy period.

In a possible design, the receiving unit is further configured to: after the sending unit sends the CS frame by using the first session parameter, receive a second CREQ frame sent by the CSI request apparatus, where the second CREQ frame is used to instruct the sending unit to terminate a current CSI measurement session and stop sending the CS frame; and the sending unit is further configured to: according to the second CREQ frame, terminate the current CSI measurement session and stop sending the CS frame.

In a possible design, the receiving, by the receiving unit, the first CREQ frame sent by the CSI request apparatus includes: receiving, by using a unicast manner, the first CREQ frame sent by the CSI request apparatus; the first CREQ frame received by the receiving unit is further used to instruct the first CSI response apparatus to send the CS frame; and the sending, by the sending unit, the CS frame by using the first session parameter includes: sending the CS frame according to an indication of the first CREQ frame and by using the first session parameter.

In a possible design, the sending unit is further configured to: before the receiving unit receives the first CREQ frame sent by the CSI request apparatus, send a broadcast frame, where the broadcast frame includes CSI responder capability indication information, and the CSI responder capability indication information is used to indicate that the CSI response apparatus has a CSI responder capability.

In a possible design, the broadcast frame broadcast by the sending unit further includes a CSI responder capability CRC information element, where the CRC information element is used to carry the capability parameter of the CSI response apparatus, to enable the CSI request apparatus that receives the broadcast frame to learn the capability parameter.

In a possible design, if the determining unit determines that a session parameter that satisfies the capability parameter does not exist in the at least one group of session parameters, a CRSP sent by the sending unit carries failure indication information, where the failure indication information is used to indicate that a request of the first CREQ frame fails.

In a possible design, the receiving unit is further configured to: after the sending unit response apparatus sends the CRSP frame to the CSI request apparatus, and before the sending unit sends the CS frame by using the first session parameter, receive a third CREQ frame sent by the CSI request apparatus, where the third CREQ frame is used to request the sending unit to start to periodically send the CS frame within a current burst period; and the sending, by the sending unit, the CS frame by using the first session parameter includes: sending the CS frame according to an indication of the third CREQ frame and by using the first session parameter.

For the technical effect of the CSI response apparatus provided in this embodiment of the present invention, refer to technical effects of the second aspect or various optional manners in the second aspect, and details are not described herein.

In a possible design, each group of session parameters of the at least one group of session parameters in the first aspect to the fourth aspect includes a transmission parameter and a scheduling parameter; the transmission parameter includes one or more parameters of a physical-layer protocol data unit (Physical-layer Protocol Data Unit, PPDU) format of the CS frame, or channel information, a transmission bandwidth, a modulation and coding scheme, or a quantity of transmit antennas or a set of transmit antennas used during transmission of the CS frame; and the scheduling parameter includes a burst period of sending the CS frame, a quantity of burst periods, a busy period of sending the CS frame within the burst period, and a time interval of sending the CS frame in the busy period.

In a possible design, the broadcast frame in the first aspect to the fourth aspect is a beacon frame or a CSI responder capability advertisement (CSI Responder Advertisement, CRA) frame.

In a possible design, the capability parameter of the CSI response apparatus in the second aspect and the fourth aspect includes one or more capability parameters of a PPDU format supported by the CSI response apparatus, a transmission bandwidth, a modulation and coding scheme, a quantity of transmit antennas or transmit antenna arrangement information, or a channel load condition detected by the CSI response apparatus.

According to a fifth aspect, an embodiment of the present invention provides a CSI request apparatus. The CSI request apparatus can implement functions performed by the CSI request apparatus in the methods in the foregoing aspects. The functions may be implemented by hardware, or may be implemented by hardware executing corresponding software. The hardware or software includes one or more modules corresponding to the functions.

In a possible design, a structure of the CSI request apparatus includes a processor and a communications interface. The processor is configured to provide support for the CSI request apparatus to perform corresponding functions in the foregoing methods. The communications interface is configured to provide support for the CSI request apparatus to communicate with another network element. The CSI request apparatus may further include a memory. The memory is configured to be coupled to the processor, and store a program instruction and data required by the CSI request apparatus.

According to a sixth aspect, an embodiment of the present invention provides a readable medium, including a computer executable instruction. When a processor of a CSI request apparatus executes the computer executable instruction, the CSI request apparatus performs the CSI measurement method in the first aspect or any implementation in the first aspect.

For the technical effect of the CSI request apparatus provided in this embodiment of the present invention, refer to technical effects of the first aspect or various optional manners in the first aspect, and details are not described herein.

According to a seventh aspect, an embodiment of the present invention provides a CSI response apparatus. The CSI response apparatus can implement functions performed by the CSI response apparatus in the method embodiments in the foregoing aspects. The functions may be implemented by hardware, or may be implemented by hardware executing corresponding software. The hardware or software includes one or more modules corresponding to the functions.

In a possible design, a structure of the CSI response apparatus includes a processor and a communications interface. The processor is configured to provide support for the CSI response apparatus to perform corresponding functions in the foregoing methods. A transceiver is configured to provide support for the CSI response apparatus to communicate with another network element. The CSI response apparatus may further include a memory. The memory is configured to be coupled to the processor, and store a program instruction and data required by the CSI response apparatus.

According to an eighth aspect, an embodiment of the present invention provides a CSI request apparatus. The apparatus includes a CSI measurement service access interface. The CSI measurement service access interface is configured to transmit at least one group of session parameters used in a CSI measurement session.

In a possible design, each group of session parameters of the at least one group of session parameters includes at least a MAC address and CSI information of a CSI response apparatus.

In a possible design, the CSI measurement service access interface is further configured to transmit a control message related to CSI measurement.

According to a ninth aspect, an embodiment of the present invention provides a CSI request apparatus and a CSI response apparatus. The CSI request apparatus and the CSI response apparatus define a CREQ frame, a CRSP frame, and a CRA frame as public system frames. In embodiments of this application, the CREQ frame, the CRSP frame, and the CRA frame are defined as public system frames, so that the CSI request apparatus and the CSI response apparatus can directly send the CREQ frame, the CRSP frame, or the CRA frame without performing an operation of joining a network.

An embodiment of the present invention provides a readable medium, including a computer executable instruction. When a processor of a CSI response apparatus executes the computer executable instruction, the CSI response apparatus performs the CSI measurement method in the second aspect or any implementation in the second aspect.

For the technical effect of the CSI response apparatus provided in this embodiment of the present invention, refer to technical effects of the second aspect or various optional manners in the second aspect, and details are not described herein.

According to a tenth aspect, an embodiment of the present invention provides a communications system, including: the CSI request apparatus in the third aspect or any optional manner in the third aspect, and the CSI response apparatus in the fourth aspect or any optional manner in the fourth aspect; or, the CSI request apparatus in the fifth aspect or any optional manner in the fifth aspect, and the CSI response apparatus in the seventh aspect or any optional manner in the seventh aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention.

FIG. 6A, FIG. 6B, and FIG. 6C are a schematic diagram of a VHT-LTF structure that may be used when a quantity of transmit antennas used by a CSI response apparatus to send a CS frame is greater than 1 according to an embodiment of the present invention;

DESCRIPTION OF EMBODIMENTS

The following describes the technical solutions in the embodiments of the present invention in detail with reference to the accompanying drawings in the embodiments of the present invention. Apparently, the described embodiments are merely some but not all of the embodiments of the present invention.

It should be noted that the terms "system" and "network" may be used interchangeably in this specification. The term "and" in this specification describes only an association relationship for describing associated objects and represents that three relationships may exist. For example, A and B may represent the following three cases: Only A exists, both A and B exist, and only B exists. In addition, the character "/" in this specification generally indicates an "or" relationship between the associated objects.

When the ordinal numbers such as "first", "second", "third" or "fourth" are mentioned in the embodiments of the present invention, unless the ordinal numbers actually indicate sequences according to the context, it should be understood that the ordinal numbers are merely for distinguishing. In addition, the terms "include", "have", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
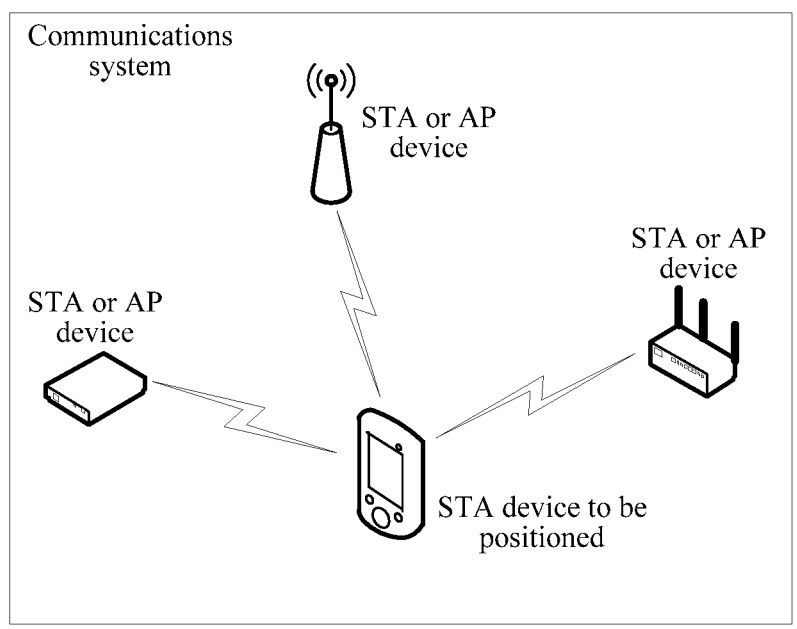
FIG. 1 is a schematic architectural diagram of a communications system according to an embodiment of the present invention.

A CSI measurement method provided in an embodiment of the present invention may be applied to a positioning scenario of an 802.11 station STA device. For example, as shown in FIG. 1, an embodiment of the present invention provides a communications system, including a STA device to be positioned and multiple surrounding 802.11 STA or AP devices with known or unknown spatial positions. The STA device to be positioned measures CSI between the STA device and the multiple surrounding 802.11 STA or AP devices, so as to calculate a position of the STA device to be positioned, thereby implementing positioning of a receiver.

It may be understood that, the CSI measurement method provided in this embodiment of the present invention may further be applied to other scenarios in which CSI needs to be obtained, for example, a scenario in which CSI between a pair of 802.11 STA devices is used to determine an object that comes between the pair of 802.11 STA devices. When a moving object comes between the pair of 802.11 STA devices, the CSI between the pair of 802.11 STA devices changes. Based on changes of the CSI, invasion detection may be performed, or the object that comes between the pair of 802.11 STA devices may be determined. At present, this application may further be applied to possible application scenarios involving CSI-based environmental perception or even researches of detecting a fine-granularity pose such as a body posture, a gesture, and breath or a slight movement of a human. This is not limited in the embodiments of this application.

It should be noted that, in the 802.11 standards, an 802.11 access point AP device also has a capability of an 802.11 STA device. In other words, an 802.11 AP device is also a STA device. The 802.11 STA device and the 802.11 AP device mentioned in this application both follow same agreements in the 802.11 standards.

To facilitate description of the embodiments of the present invention, a STA device that requests CSI measurement is referred to as a CSI request apparatus below. For example, in the foregoing scenario, a STA device that needs to obtain CSI is referred to as the CSI request apparatus. The CSI request apparatus may be any terminal having a WiFi function, for example, may be a portable, pocket-sized, handheld, computer built-in or in-vehicle mobile apparatus, or a device such as a personal communications service (PCS, Personal Communication Service) phone, a laptop computer, a touchscreen computer, a cordless phone, a wireless local loop (WLL, Wireless Local Loop) station, a personal digital assistant (PDA, Personal Digital Assistant), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

Figure 2:
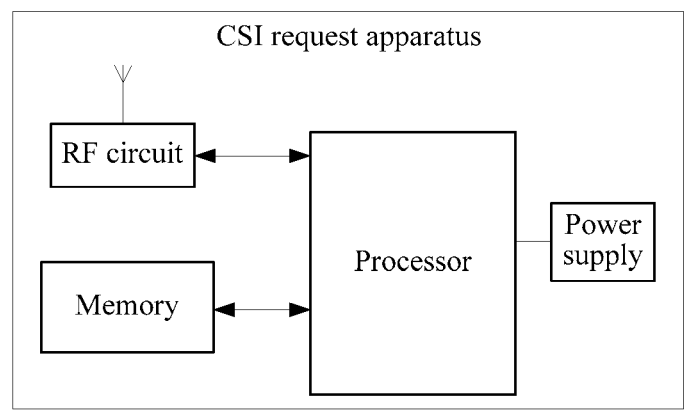
FIG. 2 is a first schematic structural diagram of a CSI request apparatus according to an embodiment of the present invention.

FIG. 2 shows a CSI request apparatus according to an embodiment of the present invention, including components such as a processor, a memory, a radio frequency (Radio Frequency, RF) circuit, and a power supply.

The processor is a control center of the CSI request apparatus, and is connected to various parts of the CSI request apparatus by using various interfaces and lines. By running or executing a software program and/or module stored in the memory, and invoking data stored in the memory, the processor performs various functions and data processing of the CSI request apparatus, thereby performing overall monitoring on the CSI request apparatus. The processor may include a digital signal processor device, a microprocessor device, an analog-to-digital converter, a digital-to-analog converter, and the like. Control and signal processing functions of the CSI request apparatus can be distributed on these devices according to respective capabilities. The RF circuit may be configured to receive and send information, and send the received information to the processor for processing. Generally, the RF circuit includes but is not limited to, an antenna, at least one amplifier, a filter, a frequency synthesizer, a low noise amplifier (Low Noise Amplifier, LNA), and a duplexer, and communicates with another device by using a WiFi signal. The power supply is configured to supply power to various components in the CSI request apparatus.

In this embodiment of the present invention, a device that sends an 802.11 CSI measurement packet may be referred to as a CSI response apparatus. The CSI response apparatus may be any device that has an 802.11 STA function, for example, 802.11 access point (AP) devices and 802.11 station (STA) devices in various forms.

Figure 3:
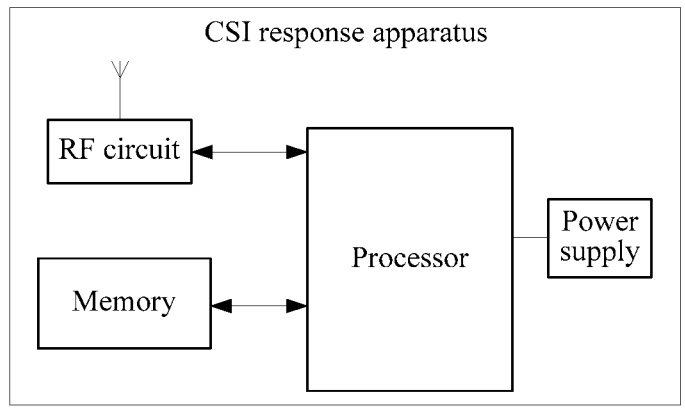
FIG. 3 is a first schematic structural diagram of a CSI response apparatus according to an embodiment of the present invention.

FIG. 3 shows a CSI response apparatus according to an embodiment of the present invention, including components such as a processor, a memory, a radio frequency (Radio Frequency, RF) circuit, and a power supply.

The processor is a control center of the CSI response apparatus, and is connected to various parts of the CSI response apparatus by using various interfaces and lines. By running or executing a software program and/or module stored in the memory, and invoking data stored in the memory, the processor performs various functions and data processing of the CSI response apparatus, thereby performing overall monitoring on the CSI response apparatus. The processor may include a digital signal processor device, a microprocessor device, an analog-to-digital converter, a digital-to-analog converter, and the like. The control and signal processing functions of the CSI response apparatus can be distributed on these devices according to respective capabilities. The RF circuit may be configured to receive and send information, and send the received information to the processor for processing. Generally, the RF circuit includes but is not limited to, an antenna, at least one amplifier, a filter, a frequency synthesizer, a low noise amplifier (Low Noise Amplifier, LNA), and a duplexer, and communicates with another device by using a WiFi signal. The power supply is configured to supply power to various components in the CSI response apparatus.

To more clearly describe the CSI measurement method provided in this embodiment of the present invention, a public action frame (Public Action Frame) used by a CSI request apparatus to perform channel sounding provided in this embodiment of the present invention is first described below. The public action frame is a type of PPDU defined in the 802.11 standards. Regardless of whether a receiver that receives a PPDU and a transmitter that transmits the PPDU are located in a same 802.11 network, the receiver can demodulate and decode the PPDU, and obtain media access control (Media Access Control, MAC) layer packet content of the PPDU.

The public action frame used by the CSI request apparatus to perform channel sounding provided in this embodiment of the present invention may be referred to as a CSI sounding frame (CSI Sounding Frame, CS frame) and is sent by a CSI response apparatus, so that the CSI request apparatus that receives the CS frame performs channel sounding to obtain CSI between the CSI response apparatus and the CSI request apparatus.

It should be noted that, in the 802.11 standards, a preamble sequence of a PPDU usually includes a short training field (Short Training Field, STF), a long training field (Long Training Field, LTF), and a signal field (signal field, SIG). The STF, the LTF, and the SIG are all predefined fixed symbol sequences. Generally, the STF is usually used to perform time and frequency synchronization between a receiver and a transmitter. The SIG is usually used to indicate information such as a rate and a length of a PPDU. The LTF is usually used by the receiver to perform channel estimation to retrieve CSI.

To better serve a channel sounding requirement, based on the 802.11 standards, the CS frame provided in this embodiment of the present invention includes only a header of a PPDU, and a load part (that is, a PSDU, a physical-layer service data unit) of the PPDU is null. After the CSI response apparatus sends a CS frame from an air interface, amplitude and a phase of a symbol in an LTF/HT-LTF/VHT-LTF in a preamble sequence of the CS frame change after passing through a transmission channel. This change corresponds to an amplitude-frequency response of the channel, and may be retrieved by the CSI request apparatus to obtain CSI.

Figure 4:
FIG. 4 is a schematic structural diagram of CS frames in different PPDU formats according to an embodiment of the present invention.
Figure 4:
Figure 4:
Figure 4:

For example, FIG. 4 shows structures of CS frames in different PPDU formats. (a) in FIG. 4 shows a structure of a CS frame in a none high throughput format (None High Throughput Format, NON-HT format, also referred to as a Legacy format). (b) in FIG. 4 shows a structure of a CS frame in a high throughput greenfield format (High Throughput Greenfield Format, HT-GF format). (c) in FIG. 4 shows a structure of a CS frame in a high throughput mixed format (High Throughput Mixed Format, HT-MF format). (d) in FIG. 4 shows a structure of a CS frame in a very high throughput format (Very High Throughput Format, VHT format).

As shown by (a) in FIG. 4, the CS frame in the NON-HT format includes one L-LTF, one L-STF, and one L-SIG L represents the legacy (Legacy) format. A preamble sequence of the CS frame in the NON-HT format includes the L-LTF. Therefore, the CS frame in the NON-HT format may be used to measure CSI of an Nrx*1-dimensional channel, and can support a transmission bandwidth such as 5 MHz, 10 MHz, and 20 MHz. Nrx is a quantity of antennas of the CSI request apparatus that receive the CS frame. A value sequence of the L-LTF in the CS frame in the NON-HT format may follow the regulation of an L-LTF in a PPDU in a NON-HT format in the 802.11 standards, and details are not described herein.

Other parts such as the L-STF and the L-SIG in the CS frame in the NON-HT format may be padded according to a corresponding regulation of a PPDU in a NON-HT format in the 802.11 standards. Particularly, a RATE (rate) field in the L-SIG is padded according to a modulation and coding scheme determined in a first session parameter negotiated by the CSI request apparatus and the CSI response apparatus. A Length field in the L-SIG is padded with 0, representing that a length of the PSDU (physical-layer service data unit) of the CS frame is 0. That is, a data load length on a physical layer of the CS frame is 0.

As shown by (b) in FIG. 4, the PPDU in the CS frame in the HT-GF format includes one HT-STF, one HT-SIG and n HT-LTFs. HT represents a high throughput (High Throughput), and n is less than or equal to 4.

As shown by (c) in FIG. 4, the PPDU in the CS frame in the HT-MF format includes one L-LTF, one L-STF, one L-SIG, one HT-STF, one HT-SIG and n HT-LTFs, where n is less than or equal to 4.

A preamble sequence of the CS frame in the HT-GF format or the HT-MF format can include four HT-LTFs at most, and can support that the CSI response apparatus simultaneously use NTx transmit antennas. Different HT-LTF structures are used for different transmit antennas to transmit the CS frame. Nix is less than or equal to 4. The CS frames in the HT-GF format and the HT-MF format can support measurement of CSI of an $N_{rx}*N_{TX}$-dimensional channel, and support a transmission bandwidth such as 20 MHz and 40 MHz. In the CS frames in the HT-GF format and the HT-MF format, value sequences of the HT-LTF at different transmission bandwidths follow the regulation of an HT-LTF in a PPDU in an HT-GF format or HT-MF format in the 802.11 standards. A quantity $N_{HT-LTF}$ of HT-LTFs in the CS frame in the HT-GF format or the HT-MF format depends on a quantity $N_{TX}$ of transmit antennas of the CSI response apparatus. A relationship between the quantity $N_{HT-LTF}$ and the quantity Nix is as follows:

$$N_{HT-LTF} = \begin{cases} N_{TX}, N_{TX} = 1, 2, 4 \\ N_{TX} + 1, N_{TX} = 3 \end{cases}.$$

Figure 5:
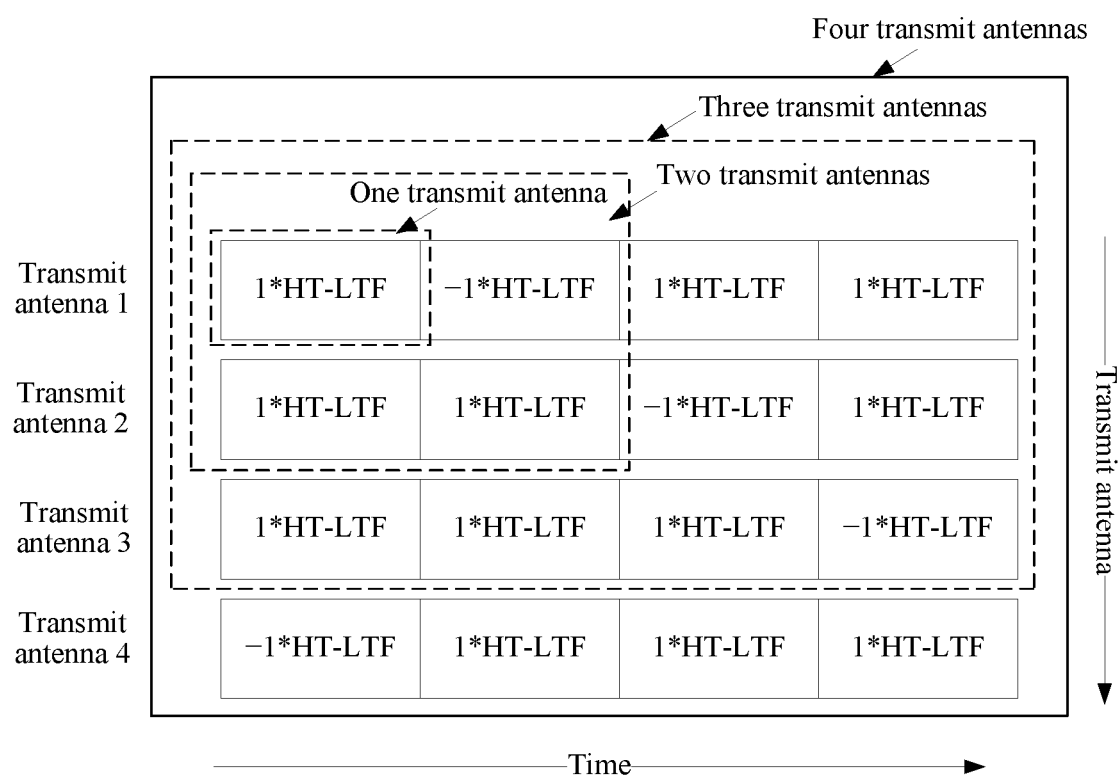
FIG. 5 is a schematic diagram of an HT-LTF structure that may be used when a quantity of transmit antennas used by a CSI response apparatus to send a CS frame is greater than 1 according to an embodiment of the present invention.

When the quantity $N_{TX}$ of transmit antennas used by the CSI response apparatus to transmit the CS frame is greater than 1, HT-LTF structures orthogonal to each other are used for CS frames transmitted on the transmit antennas, making it easy for the receiver, that is, the CSI request apparatus, of the CS frames to distinguish between signals sent by the transmit antennas, so as to retrieve channel response information corresponding to the transmit antennas. An HT-LTF structure that may be used is shown in FIG. 5. Specifically, when the quantity $N_{TX}$ of transmit antennas used by the CSI response apparatus is equal to 1, the CS frame includes one HT-LTF, and an HT-LTF structure used on a first transmit antenna is {1*HT-LTF}. When the quantity $N_{TX}$ of transmit antennas used by the CSI response apparatus is equal to 2, the CS frame includes two HT-LTFs, an HT-LTF structure used on a first transmit antenna is {1*HT-LTF, −1*HT-LTF}, and an HT-LTF structure used on a second transmit antenna is {1*HT-LTF, 1*HT-LTF}. When the quantity $N_{TX}$ of transmit antennas used by the CSI response apparatus is equal to 3, the CS frame includes four HT-LTFs, an HT-LTF structure used on a first transmit antenna is {1*HT-LTF, −1*HT-LTF, 1*HT-LTF, 1*HT-LTF}, an HT-LTF structure used on a second transmit antenna is {1*HT-LTF, 1*HT-LTF, −1*HT-LTF, 1*HT-LTF}, and an HT-LTF structure used on a third transmit antenna is {1*HT-LTF, 1*HT-LTF, 1*HT-LTF, −1*HT-LTF}. When the quantity NTx of transmit antennas used by the CSI response apparatus is equal to 4, the CS frame includes four HT-LTFs, an HT-LTF structure used on a first transmit antenna is {1*HT-LTF, −1*HT-LTF, 1*HT-LTF, 1*HT-LTF}, an HT-LTF structure used on a second transmit antenna is {1*HT-LTF, 1*HT-LTF, −1*HT-LTF, 1*HT-LTF}, an HT-LTF structure used on a third transmit antenna is {1*HT-LTF, 1*HT-LTF, 1*HT-LTF, −1*HT-LTF}, and an HT-LTF structure used on a fourth transmit antenna is {−1*HT-LTF, 1*HT-LTF, 1*HT-LTF, 1*HT-LTF}.

When the quantity $N_{TX}$ of transmit antennas used by the CSI response apparatus to transmit the CS frame is greater than 1, cyclic shift delays (Cyclic Shift Delay) of the CS frame on the transmit antennas follow a regulation of transmission of PPDUs in an HT-GF format and an HT-MF format on multiple antennas in the 802.11 standards, and details are not described herein.

Other parts such as the HT-GF-STF, the HT-STF, the L-STF, the L-LTF, the L-SIG and the HT-SIG in the CS frames in the HT-GF format and the HT-MF format may be padded according to a corresponding regulation of PPDU frames in an HT-GF format and an HT-MF format in the 802.11 standards. Particularly, a CBW (bandwidth) field in the HT-SIG part is padded according to a transmission bandwidth parameter determined in a first session parameter negotiated by the CSI request apparatus and the CSI response apparatus. Values of an MCS field and a Number of Extension Spatial Streams (Number of Extension Spatial Streams) field in the HT-SIG part may be padded according to a parameter of a quantity of transmit antennas determined in the first session parameter negotiated by the CSI request apparatus and the CSI response apparatus. A sum of a number of spatial streams that corresponds to a modulation and coding scheme indicated in the MCS field and a number of extension spatial streams that is indicated by the Number of Extension Spatial Streams field should be equal to the quantity of transmit antennas determined in the first session parameter.

For example, if the quantity of transmit antennas determined in the first session parameter is 4 and the number of spatial streams that corresponds to the modulation and coding scheme indicated in the MCS field is 1, the number of extension spatial streams that is indicated in the Number of Extension Spatial Streams field needs to be set to 3.

In addition, an STBC (space time block code) indication bit in the HT-SIG part is padded with 0, representing that no space time block code is used in the CS frame. An HT Length field in the HT-SIG part is padded with 0, representing that a length of a PSDU (physical-layer service data unit) in the CS frame is 0. That is, a data load length on a physical layer of the CS frame is 0. Padding values of other fields in the HT-SIG part of the CS frame should not conflict with the padding values of the fields particularly mentioned above, and details are not described herein.

As shown by (d) in FIG. 4, a preamble sequence of the CS frame in the VHT format is an NDP in the VHT format, and includes one L-LTF, one L-STF, one L-SIGs one VHT-SIG-A, one VHT-STF, one VHT-SIG-B, and n VHT-LTFs, where n is less than or equal to 8, and VHT represents a very high throughput (Very High Throughput).

The preamble sequence of the CS frame in the VHT format can include eight VHT-LTFs at most, and can support CSI measurement when the quantity NTx of transmit antennas used by the CSI response apparatus to transmit the CS frame is less than or equal to 8, and may be used to measure CSI of an $N_{rx}*N_{TX}$-dimensional channel and support a transmission bandwidth such as 20 MHz, 40 MHz, 80 MHz, and 160 MHz. Value sequences of a VHT-LTF in the CS frame in the VHT format in different transmission bandwidths may follow a regulation of a VHT-LTF in a PPDU in a VHT format in the 802.11 standards. A quantity $N_{VHT\text{-}LTF}$ of VHT-LTFs in the CS frame in the VHT format depends on $N_{TX}$. A relationship between $N_{VHT\text{-}LTF}$ and $N_{TX}$ is as follows:

$$N_{VHT\text{-}LTF} = \begin{cases} N_{TX}, N_{TX} = 1, 2, 4, 6, 8 \\ N_{TX} + 1, N_{TX} = 3, 5, 7 \end{cases}.$$

Figure 6A:
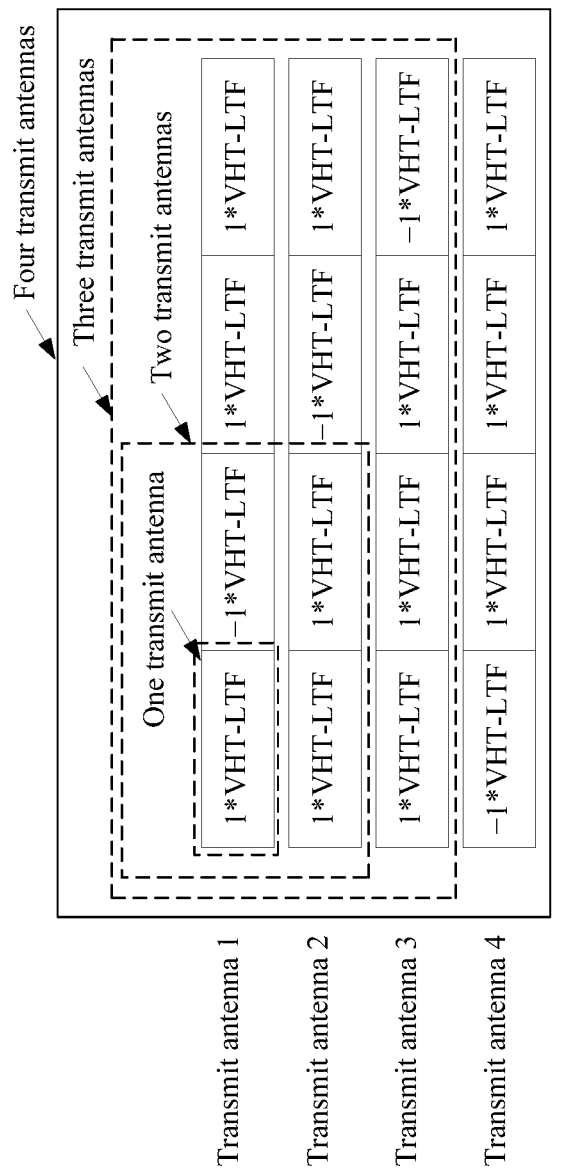

When the quantity $N_{TX}$ of transmit antennas used by the CSI response apparatus to transmit the CS frame is greater than 1, VHT-LTF structures orthogonal to each other are used for CS frames transmitted on the transmit antennas, making it easy for the receiver, that is, the CSI request apparatus, of the CS frames to distinguish between signals sent by the transmit antennas, so as to retrieve channel response information corresponding to the transmit antennas. A VHT-LTF structure that may be used is shown in FIG. 6A, FIG. 6B, and FIG. 6C. (a) in FIG. 6A shows an LTF structure used for transmit antennas when NTx is less than or equal to 4. (b) in FIG. 6B shows an LTF structure used for transmit antennas when NTx is equal to 5 or 6. (c) in FIG. 6C shows an LTF structure used for transmit antennas when $N_{TX}$ is equal to 7 or 8.

When the quantity $N_{TX}$ of transmit antennas used by the CSI response apparatus to transmit the CS frame is greater than 1, cyclic shift delays of the CS frame in the VHT format on the transmit antennas follow a regulation of transmission of a PPDU in a VHT format on multiple antennas in the 802.11 standards, and details are not described herein.

Other parts such as the L-STF, the L-LTF, the L-SIG; the VHT-SIG-A, and the VHT-SIG-B in the CS frame in the VHT format may be padded according to a regulation of a VHT SU PPDU (VHT single user PPDU) in the 802.11 standards. Particularly, a BW (bandwidth) field in the VHT-SIG-A part is padded with a transmission bandwidth determined in a first session parameter negotiated by the CSI request apparatus and the CSI response apparatus. An NSTS field in the VHT-SIG-A part may be padded, according to a requirement of the present invention, a quantity of transmit antennas determined in the first session parameter negotiated by the CSI request apparatus and the CSI response apparatus. When the quantity of transmit antennas is equal to 1, the NSTS field is padded with 0; when the quantity of transmit antennas is equal to 2, the NSTS field is padded with 1; . . . ; when the quantity of transmit antennas is equal to 8, the NSTS field is padded with 7. That is, the padding value is equal to the quantity of transmit antennas minus 1. An SU VHT-MCS field in the VHT-SIG-A part is padded with an index value of a modulation and coding scheme determined in the first session parameter negotiated by the CSI request apparatus and the CSI response apparatus. An STBC (space time block code) indication bit in the VHT-SIG-A part is padded with 0, representing that no space time block code is used in the CS frame. A VHT-SIG-B Length field in the VHT-SIG-B part is padded with 0, representing that a length of a PSDU (physical-layer service data unit) in the CS frame is 0. That is, a data load length on a physical layer of the CS frame is 0. Padding values of other fields in the VHT-SIG-A part and the VHT-SIG-B part in the CS frame should not conflict with the padding values of the fields particularly mentioned above, and details are not described herein. In the present invention, after the CSI request apparatus and the CSI response apparatus obtain the first session parameter through negotiation, before sending each CS frame according to the first session parameter, the CSI response apparatus needs to first send a channel sounding leading CSL (CS Leading) frame. The CSL frame accesses a channel by using an 802.11 CSMA/CA manner. The CSI response apparatus sends the CS frame immediately after a SIFS (Short Inter-Frame Space) time after sending of the CSL frame is completed.

Figure 7:
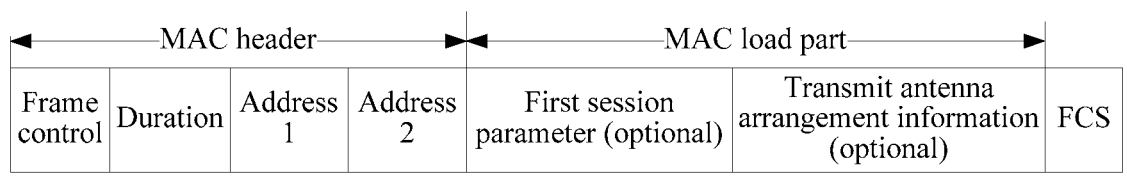
FIG. 7 is a schematic structural diagram of a CSL frame according to an embodiment of the present invention.

The CSL frame is used to notify a sender address and a receiver address of the CS frame that is sent closely after the CSL frame, or may further selectively carry some other data, for example, transmit antenna arrangement information used to send the CS frame and the first session parameter. In this embodiment of the present invention, a MAC-layer protocol data unit (MAC-layer Protocol Data Unit, MPDU) of the CSL frame is shown in FIG. 7, and includes a MAC header and a MAC load part.

The MAC header of the CSL frame includes a frame control (Frame Control) field, a duration (Duration) field, an address 1 field, and an address 2 field. These fields may be padded following a regulation of a control frame (Control Frame) in the 802.11 standards. For example, a control field of the CSL frame may include a series of indication bits used to indicate that a protocol version used by the CSL frame is a default version, a frame type is a management frame, a frame subtype is an action frame (Action Frame) or an action no ack frame (Action No Ack Frame), no more packet fragments are included, and other information. The duration field is used to indicate a sum of a transmission time of the CSL frame, a SIFS time, and a transmission time of the CS frame. That is, during padding of the duration field of the CSL frame, a channel time that needs to be occupied needs to be reserved for transmission of both the CSL frame and the CS frame. The address 1 field indicates a MAC address of a receiver of the CSL frame and the CS frame. In this embodiment of the present invention, the CSL frame and the CS frame may be broadcast frames or unicast frames. Therefore, the address 1 field may be set as a MAC broadcast address or a MAC address of a peer CSI request apparatus. The address 2 field indicates a MAC address of a sender, and may be set, in the CSL frame, as a MAC address of the CSI response apparatus that sends the CSL frame and the CS frame.

Optionally, the MAC load part of the CSL frame may carry the transmit antenna arrangement information used by the CSI response apparatus to send the CS frame. The transmit antenna arrangement information is used to unambiguously indicate relative positions of the transmit antennas in three-dimensional space. The information may have various expression manners. For example, the information may be presented by using three-dimensional spatial coordinates of the transmit antennas. The three-dimensional spatial coordinates may be absolute position coordinates. Alternatively, the spatial position of one of the transmit antennas is used as a coordinate reference origin, and three-dimensional spatial coordinates of the other transmit antennas may be expressed as three-dimensional offsets with respect to the coordinate reference origin. When the transmit antennas are arranged in a regular geometric shape, for example, a uniform linear array, a rectangular array or a circular array, alternatively, the regular geometric shape may be directly included in the transmit antenna arrangement information. The receiver of the CS frame may use the transmit antenna arrangement information in conjunction with measured CSI information, to retrieve an angle of departure (AOD) or an angle of arrival (AOA) of a radio signal corresponding to the CS frame, so as to perform positioning.

Optionally, when the CSL frame is sent in a broadcast manner, a first session parameter negotiated by the CSI request apparatus and the CSI response apparatus in a current CSI measurement session may further be added to the MAC load part of the CSL frame. It should be particularly noted that, a value of a burst period quantity parameter in a scheduling parameter included in the first session parameter carried in the CSL frame is a quantity of remaining burst periods at a current moment in the current CSI measurement session. An objective of adding the first session parameter to the CSL frame is as follows: After a first CSI request apparatus and a first CSI response apparatus complete negotiation and successfully establish a first CSI measurement session, a second CSI request apparatus that has not established a CSI measurement session may appear within WiFi signal coverage of the first CSI response apparatus. After receiving a CSL frame broadcast by the first CSI response apparatus, the second CSI request apparatus may determine, according to a first session parameter carried in the CSL frame, whether a CS frame sent in a first CSI measurement session can satisfy a CSI measurement requirement of the second CSI request apparatus in terms of a transmission parameter and a scheduling parameter. When the CS frame can satisfy the CSI measurement requirement, the second CSI request apparatus may directly use the CSL frame and the CS frame broadcast in the first CSI measurement session to perform CSI measurement without establishing a new CSI measurement session.

An FCS field is used to check the CSL frame. The definition of the FCS field and a method for generating the FCS field follow the existing 802.11 standards.

For the definition of the CSL frame provided above, a control frame needs to be added to the 802.11 standards. Optionally, the CSL frame may be implemented by making a necessary change to the existing definition of a frame format of an NDP announcement (NDP Announcement) frame defined in the 802.11 standards. According to the existing regulation of an 802.11 NDP mechanism, one or more station information (STA Info) fields exist in an NDP announcement frame and are used to carry association IDs (Association ID) of one or more target receivers that are located in a same BSS (Basic Service Set) or IBSS (Independent BSS) network as a sender. After receiving the NDP announcement frame and the NDP frame, the one or more target receivers need to return CSI feedback information or noncompressed beamforming (Noncompressed beamforming) feedback information or compressed beamforming (Compressed beamforming) feedback information to the sender. In this application, a receiver that receives the CSL frame and the CS frame does not need to return the feedback information to the sender.

Specifically, two unused reserved bits B0 and B1 exist in a Sounding Dialog Token field of the NDP announcement frame. One of the bits may be used as a feedback indication bit used to indicate whether the receiver, after receiving the NDP announcement frame and the NDP frame that closely follows the NDP announcement frame, returns the feedback information according to the existing NDP mechanism in the 802.11 standards or follows a processing mechanism defined in the present invention, in which the receiver only needs to obtain a MAC address of a sender and corresponding CSI information from the NDP announcement frame and the NDP frame but does not need to return the feedback information.

For example, when the feedback indication bit is 1, processing is performed according to the existing NDP mechanism in 802.11, that is, one or more receivers receive the NDP announcement frame and the NDP frame and then return the feedback information. When the feedback indication bit is 0, a processing manner of a combination of a CSL frame and a CS frame is used, and the feedback information does not need to be returned.

Figure 8:
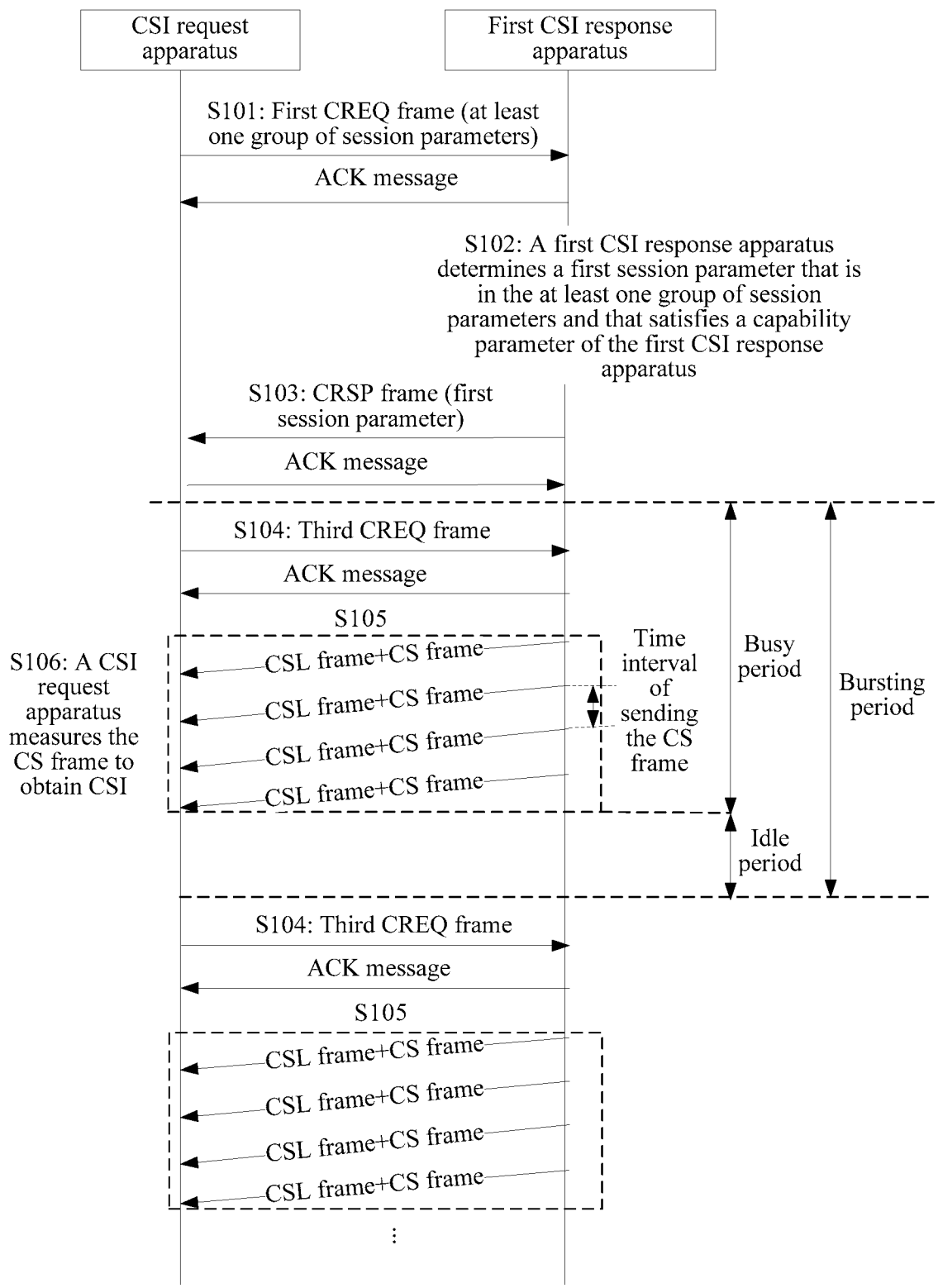
FIG. 8 is a first interaction diagram of a CSI measurement method according to an embodiment of the present invention.

Based on the CSL frame and the CS frame provided in the foregoing embodiments of the present invention, FIG. 8 shows a CSI measurement method according to an embodiment of the present invention. The method may include the following steps.

S101: A CSI request apparatus sends a first CREQ frame, where the first CREQ frame includes at least one group of session parameters that the CSI request apparatus expects to use, and the first CREQ frame is used to request a CSI response apparatus that receives the first CREQ frame to determine, in the at least one group of session parameters, a group of session parameters used to transmit a CS frame.

Specifically, in different designs, the CSI request apparatus may send the first CREQ frame by using different manners. For example, the CSI request apparatus may send the first CREQ frame to a specified CSI response apparatus by using a unicast manner, or may broadcast the first CREQ frame by using a broadcast manner.

The first CREQ frame is another public action frame provided in this embodiment of the present invention. A header of the first CREQ frame may be a general header of a management frame in the 802.11 standards, and a load part of the first CREQ frame may carry the at least one group of session parameters that the CSI request apparatus expects to use.

In an example, each group of session parameters of the at least one group of session parameters carried in the first CREQ frame includes a transmission parameter and a scheduling parameter.

Optionally, the transmission parameter may include one or more parameters of a PPDU format of the CS frame that the CSI request apparatus expects to use, or channel information, a transmission bandwidth, a modulation and coding scheme, or a quantity of transmit antennas or a set of transmit antennas used during transmission of the CS frame.

For example, the PPDU format of the CS frame may include a NON-HT format, an HT-MF format, an HT-GF format, a VHT format or another PPDU format that will appear in the IEEE 802.11 standards and that can support a higher bandwidth and more spatial streams.

A frequency band used to transmit the CS frame may include 2.4 GHz, 5 GHz, and another frequency band that will appear in the IEEE 802.11 standards. Channel information used to transmit the CS frame is used to unambiguously indicate a channel used to send the CS frame. According to the 802.11 standards, the channel information may be uniquely determined by a triplet <country Country, operation class Operation Class, primary channel number Primary Channel Number>.

The transmission bandwidth may include 5 MHz, 10 MHz, 20 MHz, 40 MHz, 80 MHz, 160 MHz, or another standard bandwidth that will appear in the IEEE 802.11 standards. When a wider transmission bandwidth is used to transmit the CS frame, a time of transmitting the CS frame on the channel can be more precisely estimated by means of CSI measurement. Preferably, as allowed by capabilities of the CSI request apparatus and the CSI response apparatus, to obtain higher measurement precision of a transmission time, a relatively high transmission bandwidth should be used to transmit the CS frame.

The modulation and coding scheme used to transmit the CS frame may include modulation and coding schemes MCSs defined in different transmission bandwidths in 802.11 for a NON-HT, an HT, a VHT, and another physical layer type that will appear in the IEEE 802.11 standards. The quantity of transmit antennas used to send the CS frame may be any possible quantity of transmit antennas that is greater than or equal to 1 and that can be supported by the CSI response apparatus. A quantity of LTFs in a preamble sequence of the CS frame depends on the quantity of transmit antennas for sending the CS frame. For example, if the CSI response apparatus can use eight transmit antennas to send the CS frame, the CS frame may use a VHT PPDU format that carries eight LTFs.

Before sending the first CREQ frame, the CSI request apparatus may learn spatial arrangement information of all transmit antennas of a target CSI response apparatus, that is, relative positions of all the transmit antennas in three-dimensional space. When a set of antennas that is expected to be used by the target CSI response apparatus to transmit the CS frame is a proper subset of a set of all transmit antennas of the CSI response apparatus, the transmission parameter carried in the first CREQ frame may include, according to the spatial arrangement information of all the transmit antennas of the target CSI response apparatus, a set of transmit antennas that is expected to be used by the target CSI response apparatus to transmit the CS frame, to explicitly specify antennas that are expected to be specifically used by the target CSI response apparatus to transmit the CS frame.

It may be understood that, when a larger quantity of transmit antennas is used to transmit the CS frame, the CS frame may carry a larger quantity of LTFs, a larger channel dimension may be measured by the CSI request apparatus, and channel information included in obtained CSI is richer. Optionally, the scheduling parameter may include a burst period of sending the CS frame, a quantity of burst periods, a busy period of sending the CS frame within the burst period, and a time interval of sending the CS frame in the busy period.

Optionally, the scheduling parameter may further include a start time of a first burst period.

It should be noted that, in this embodiment of the present invention, the CSI response apparatus that sends the CS frame may send the CS frame according to a burst period. Each burst period may further include a busy period and an idle period. The CSI response apparatus periodically sends the CS frame in the busy period, and does not send the CS frame in the idle period. For example, it is assumed that every burst period lasts 10 seconds. Within one burst period, the first five seconds is a busy period, and the last five seconds is an idle period. In this case, the CSI response apparatus periodically sends the CS frame within the first five seconds of the 10 seconds, and does not send the CS frame in the last five seconds. It is assumed that a time interval of sending the CS frame in the busy period is one second. In this case, the CSI response apparatus sends one CS frame at an interval of one second within the first five seconds within each burst period. If a quantity of burst periods is 5, after five burst periods, a first CSI response apparatus stops sending the CS frame.

In an example, when a session parameter can make CSI obtained by the CSI request apparatus have higher precision and a larger amount of information, the CSI request apparatus has a larger expected value for the session parameter. The CSI request apparatus may set, according to an expected value of the CSI request apparatus for each group of session parameters of the at least one group of session parameters, the at least one group of session parameters in the load part of the first CREQ in descending order, so that the first CSI response apparatus can sequentially parse session parameters in the first CREQ frame in descending order of expected values, and select a group of session parameters that can be satisfied by a capability parameter of the CSI response apparatus and that has the highest expected value to transmit the CS frame, to enable the CSI request apparatus to obtain CSI with higher precision.

Optionally, after receiving the first CREQ frame, the CSI response apparatus that receives the first CREQ frame may send an acknowledgement (ACK) message to the CSI request apparatus to notify the CSI request apparatus that the first CSI response apparatus has received the first CREQ frame, thereby preventing the CSI request apparatus from repeatedly sending the first CREQ frame to the first CSI response apparatus when the CSI request apparatus is uncertain whether the first CSI response apparatus receives the first CREQ frame.

S102: The first CSI response apparatus determines a first session parameter that is in the at least one group of session parameters and that satisfies a capability parameter of the first CSI response apparatus.

If the first CSI response apparatus receives the first CREQ frame sent by the CSI request apparatus, the first CSI response apparatus may determine, in the at least one group of session parameters carried in the first CREQ frame, a group of session parameters used to transmit a CS frame.

It may be understood that the first CREQ frame is a public action frame. Therefore, after the first CSI response apparatus receives the first CREQ frame, even if the CSI request apparatus does not join a network of the first CSI response apparatus, the first CSI response apparatus can still parse the at least one group of session parameters carried in the first CREQ frame, and after obtaining the at least one group of session parameters, determine, according to a current capability parameter of the first CSI response apparatus, whether the first CSI response apparatus can respond to a request of the first CREQ frame, that is, determine whether the first session parameter that can satisfy the current capability parameter of the first CSI response apparatus exists in the at least one group of session parameters.

Optionally, the capability parameter may include one or more capability parameters of a PPDU format supported by the first CSI response apparatus, a transmission bandwidth, a modulation and coding scheme, a quantity of transmit antennas or transmit antenna arrangement information, or a channel load condition detected by the first CSI response apparatus.

The channel load condition detected by the first CSI response apparatus may be represented by using a channel duty cycle with a fine granularity of each channel detected by the first CSI response apparatus. For example, for a channel numbered 1, a current duty cycle is 20%. For a channel numbered 2, a channel duty cycle is 30%. Alternatively, the channel load condition detected by the first CSI response apparatus may be represented by using a channel duty cycle with a coarse granularity. For example, a channel numbered 1 is currently in a busy (busy) state, a channel numbered 2 is currently in a normal (normal) state, and a channel numbered 3 is currently in an idle (idle) state. When the channel duty cycle is above 20%, it may be considered that the channel is in a busy state. When the channel duty cycle ranges from 5% to 20%, it may be considered that the channel is in a normal state. When the channel duty cycle is less than 5%, it may be considered that the channel is in an idle state.

In this embodiment of the present invention, after obtaining the at least one group of session parameters from the first CREQ frame, for each group of session parameters, the first CSI response apparatus may determine whether the capability parameter of the first CSI response apparatus can satisfy the group of session parameters, that is, determine whether the capability parameter of the first CSI response apparatus satisfies a transmission parameter and a scheduling parameter in the group of session parameters.

For example, a first group of session parameters of the at least one group of session parameters is used as an example. It is assumed that a transmission parameter in the first group of session parameters includes: a quantity of transmit antennas that are expected to be used is 6, and a PPDU format of the CS frame that is expected to be used is a VHT format. If the first CSI response apparatus can use six transmit antennas to send the CS frame in the VHT format, the capability parameter of the first CSI response apparatus satisfies the transmission parameter in the first group of session parameters. If the first CSI response apparatus cannot use six transmit antennas to send the CS frame, and/or the first CSI apparatus does not support the CS frame in the VHT format, the capability parameter of the first CSI response apparatus does not satisfy the transmission parameter in the first group of session parameters.

It is assumed that a scheduling parameter in the first group of session parameters includes: a burst period, a busy period of sending the CS frame within the burst period, and a time interval of sending the CS frame in the busy period. The first CSI response apparatus may calculate a possible channel duty cycle in each busy period according to a time interval of sending the CS frame in each busy period and a channel time that needs to be occupied to send each CS frame. If a sum of the calculated channel duty cycle in the busy period and a current channel duty cycle detected by the first CSI response apparatus is greater than a preset threshold, for example, the sum of the calculated channel duty cycle in the busy period and the current channel duty cycle is greater than 80%, the capability parameter of the first CSI response apparatus does not satisfy the scheduling parameter in the first group of session parameters. If the sum of the calculated channel duty cycle in the busy period and the current channel duty cycle is less than or equal to the preset threshold, for example, the sum of the calculated channel duty cycle in the busy period and the current channel duty cycle is less than or equal to 80%, the capability parameter of the first CSI response apparatus satisfies the scheduling parameter in the first group of session parameters.

It should be noted that, in this embodiment of the present invention, it may alternatively be determined, based on a scheduling parameter in a session parameter and the channel load condition of the first CSI response apparatus and by using another policy, whether the capability parameter of the first CSI response apparatus satisfies the scheduling parameter. When the capability parameter of the first CSI response apparatus satisfies both a scheduling parameter and a transmission parameter in a group of sessions, it may be determined that the capability parameter of the first CSI response apparatus satisfies the group of session parameters.

Optionally, when the at least one group of session parameters is set in the first CREQ in descending order of expected values of the CSI request apparatus, the first CSI response apparatus may sequentially perform determining according to an order of the at least one group of session parameters. Because the first group of session parameters is a group of session parameters with the maximum expected value of the CSI request apparatus, when the first CSI response apparatus determines that the capability parameter of the first CSI response apparatus satisfies the first group of session parameters, the first CSI response apparatus may directly determine the first group of session parameters as the first session parameter, but does not need to determine other session parameters in the at least one group of session parameters. When the first CSI response apparatus determines that the capability parameter of the first CSI response apparatus does not satisfy the first group of session parameters, the first CSI response apparatus may perform determining on a second group of session parameters, and so on.

S103: The first CSI response apparatus sends a CRSP frame to the CSI request apparatus, where the CRSP frame includes the first session parameter, and the CRSP frame is used to instruct the CSI request apparatus to receive, by using the first session parameter, a CS frame sent by the first CSI response apparatus.

The CRSP frame is another public action frame provided in this embodiment of the present invention. A header of the CRSP frame may be a general header of a management frame in the 802.11 standards, and a load part of the CRSP frame may carry the first session parameter.

Optionally, after receiving the CRSP frame, the CSI request apparatus further sends ACK information to the first CSI response apparatus, to notify the first CSI response apparatus that the CSI request apparatus has received the CRSP frame, thereby preventing the first CSI response apparatus from repeatedly sending the CRSP frame to the CSI request apparatus when the first CSI response apparatus is uncertain whether the CSI request apparatus receives the CRSP.

S104: At the beginning of each burst period regulated in the first session parameter, the CSI request apparatus sends a third CREQ frame to the first CSI response apparatus to trigger the first CSI response apparatus to start to periodically send the CS frame within a current burst period.

It should be specifically noted that after the CSI request apparatus and the first CSI response apparatus determine the first session parameter, at a start moment of each burst period regulated in the first session parameter, the CSI request apparatus needs to send the third CREQ frame to the first CSI response apparatus, to trigger the first CSI response apparatus to periodically send the CS frame within the burst period. From a start moment of a first burst period regulated in the first session parameter, the first CSI response apparatus starts to perform an operation of periodically sending the CS frame within the burst period only after receiving the third CREQ frame. If the first CSI response apparatus does not receive the third CREQ frame within the burst period, the first CSI response apparatus does not send any CS frame within the burst period. When a next burst period starts, the foregoing process is repeated. After a quantity of consecutive burst periods within which the first CSI response apparatus does not receive the third CREQ frame exceeds a preset quantity, the first CSI response apparatus may unilaterally terminate a current CSI measurement session.

S105: The first CSI response apparatus sends the CS frame according to an indication of the third CREQ frame and by using the first session parameter. The first CSI response apparatus first sends a CSL frame, and sends the CS frame by using the first session parameter after a SIFS time after sending of the CSL frame is completed.

Specifically, if the scheduling parameter in the first session parameter includes a start time of the first burst period, the first CSI response apparatus starts to access the channel and send the CSL frame at this time. Otherwise, after the first CSI response apparatus finishes sending the CRSP frame indicating that negotiation succeeds and receives an ACK frame returned by a first CSI request apparatus, the first CSI response apparatus may immediately start to access the channel and send the CSL frame. The first CSI response apparatus sends the CS frame by using the first session parameter immediately after the SIFS time after sending of the CSL frame is completed.

For example, it is assumed that the transmission parameter in the first session parameter includes: transmission channel information <country: Europe, operation class: 128, primary channel number: 58> of the CS frame, the CS frame in the VHT format, six transmit antennas, an 80-MHz transmission bandwidth, and a modulation and coding scheme whose index value is equal to 0. The scheduling parameter in the first session parameter includes three burst periods having duration of 10 seconds each. The first five seconds of each burst period is a busy period, and the last five seconds of each burst period is an idle period. A time interval of sending the CS frame in each busy period is 0.5 seconds.

After determining the first session parameter, at a communication frequency channel number determined by the triplet <country: Europe, operation class: 128, primary channel number: 58>, according to the 80-MHz transmission bandwidth and by using the modulation and coding scheme whose index value is 0, the first CSI response apparatus may send one CS frame in the VHT format by using six transmit antennas every 0.5 seconds within the first five seconds of each of three consecutive burst periods each lasting 10 seconds.

The CSI request apparatus receives, at the communication frequency channel number determined by the triplet <country: Europe, operation class: 128, primary channel number: 58>, the CS frame in the VHT format within each busy period also according to the first session parameter negotiated by the CSI request apparatus and the first CSI response apparatus and according to the indication of the scheduling parameter.

S106: The CSI request apparatus measures the CS frame to obtain CSI.

After receiving the CS frame, the CSI request apparatus may measure and calculate a preamble sequence of the CS frame to obtain the CSI.

For a specific manner in which the CSI request apparatus measures and calculates the preamble sequence of the CS frame provided in this embodiment of the present invention to obtain the CSI, refer to a specific manner in which a receiver retrieves CSI from a preamble sequence of a PPDU in the prior art, and details are not described herein. In the CSI measurement method provided in this embodiment of the present invention, the CSI request apparatus and the first CSI response apparatus can negotiate a session parameter by using the first CREQ frame and the CRSP frame, determine the first session parameter that the CSI request apparatus expects to use and that can be satisfied by the capability parameter of the first CSI response apparatus, and transmit the CS frame by using the first session parameter, so that the CSI request apparatus measures the CS frame to obtain the CSI. In a process of obtaining the CSI by using the method, the CSI request apparatus does not need to join a network of the first CSI response apparatus. Therefore, bandwidth overheads of the CSI request apparatus and the first CSI response apparatus are reduced, and a time delay of obtaining the CSI by the CSI request apparatus is reduced.

Figure 9:
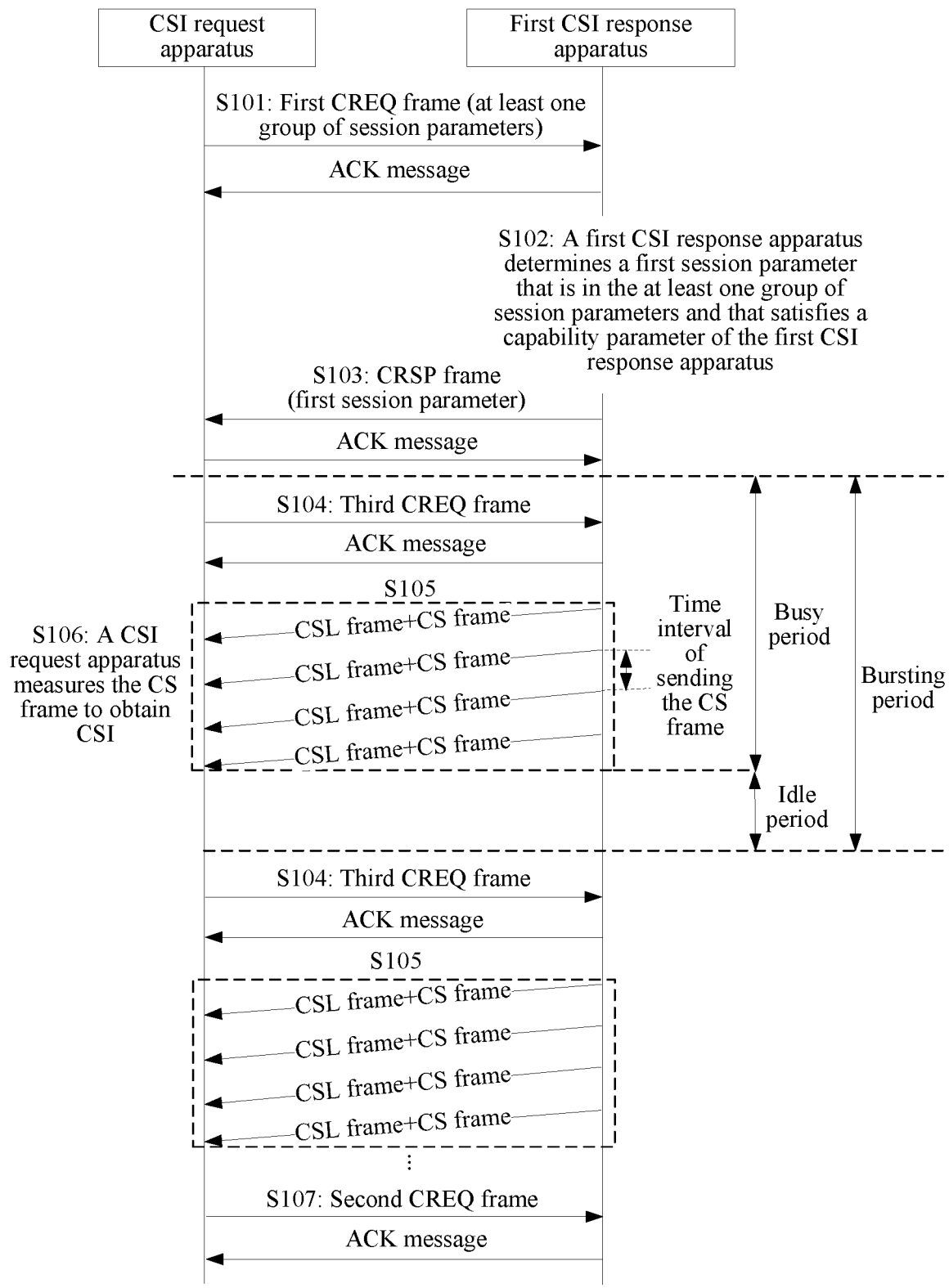
FIG. 9 is a second interaction diagram of a CSI measurement method according to an embodiment of the present invention.

Further, before session duration determined in the first session parameter ends, if the CSI request apparatus ends a current session in advance, that is, if the CSI request apparatus stops in advance measuring the CSI between the CSI request apparatus and the first CSI response apparatus, as shown in FIG. 9, the method may further include:

S107: The CSI request apparatus sends a second CREQ frame to the first CSI response apparatus, where the second CREQ frame is used to instruct the first CSI response apparatus to terminate a current CSI measurement session and stop sending the CS frame.

It may be understood that in this embodiment of the present invention, when the CSI request apparatus stops measuring the CSI between the CSI request apparatus and the first CSI response apparatus, the CSI request apparatus can instruct the first CSI response apparatus in time by using the second CREQ frame to stop sending the CS frame, thereby reducing power consumption of the first CSI response apparatus and saving transmission resources of the first CSI response apparatus.

In an example, based on the foregoing method shown in FIG. 8 and FIG. 9, this embodiment of the present invention provides a preferred procedure of the CSI measurement method. In the preferred procedure, with reference to an advertisement mechanism provided in this embodiment of the present invention, the CSI response apparatus can autonomously advertise that the CSI response apparatus has a CSI responder capability, thereby preventing the CSI request apparatus from sending a request to a CSI response apparatus that cannot send the CS frame, so as to reduce power consumption of the CSI request apparatus and save transmission resources.

Figure 10:
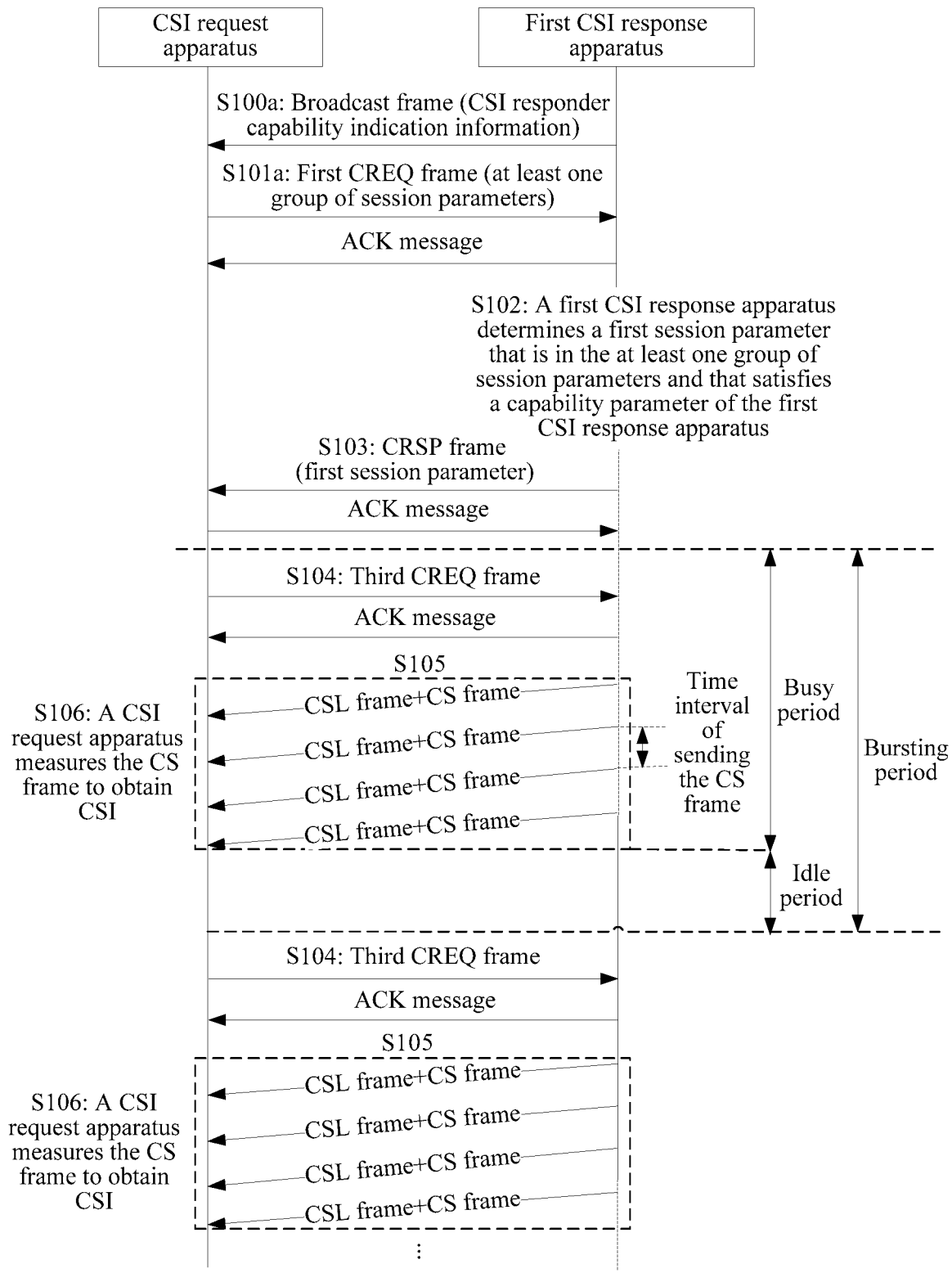
FIG. 10 is a third interaction diagram of a CSI measurement method according to an embodiment of the present invention.

Specifically, with reference to FIG. 8, as shown in FIG. 10, before S101, the method may further include:

S100a: The first CSI response apparatus sends a broadcast frame, where the broadcast frame includes CSI responder capability indication information, and the CSI responder capability indication information is used to indicate that the first CSI response apparatus has a CSI responder capability.

Specifically, in this embodiment of the present invention, the first CSI response apparatus may broadcast and send the broadcast frame carrying the CSI responder capability indication information, so as to advertise, to a CSI request apparatus that can receive the broadcast frame, that the first CSI response apparatus has the CSI responder capability.

The CSI request apparatus may receive, by using an active scanning manner or a passive scanning manner, the broadcast frame sent by the first CSI response apparatus, and determine, according to the CSI responder capability indication information in the broadcast frame, that the first CSI response apparatus can send the CS frame.

In the preferred procedure, the CSI request apparatus can determine, according to the broadcast frame obtained through scanning, the CSI response apparatus that has the CSI responder capability, so that the CSI request apparatus can select a specific CSI response apparatus and send the first CREQ frame in a unicast manner. That is, in the preferred procedure, the foregoing S101 may specifically include:

S101a: After determining the first CSI response apparatus according to the CSI responder capability indication information, the CSI request apparatus sends the first CREQ frame to the first CSI response apparatus.

By using the preferred procedure, the CSI response apparatus can advertise, by using the broadcast frame carrying the CSI responder capability indication information, that the CSI response apparatus has the CSI responder capability, making it convenient for the CSI request apparatus to discover in time a surrounding CSI response apparatus (for example, the first CSI response apparatus), thereby preventing the CSI request apparatus from sending the first CREQ frame to an 802.11 AP device or STA device that does not have the CSI responder capability, so as to reduce bandwidth overheads of the CSI request apparatus and a time delay of obtaining the CSI by the CSI request apparatus.

Further, the broadcast frame may further include a CSI responder capability (CSI Responder Capabilities, CRC) information element, where the CRC information element carries one or more capability parameters of a PPDU format supported by the first CSI response apparatus, a transmission bandwidth, a modulation and coding scheme, a quantity of transmit antennas or transmit antenna arrangement information, or a channel load condition detected by the first CSI response apparatus of the first CSI response apparatus.

That is, in this embodiment of the present invention, the first CSI response apparatus may further advertise the current capability parameter of the first CSI response apparatus by using the CRC information element of the broadcast frame, making it convenient for the CSI request apparatus to learn the specific capability parameter of the first CSI response apparatus.

In an example, after learning the capability parameter of the first CSI response apparatus, the CSI request apparatus may further determine, according to the capability parameter of the first CSI response apparatus, the at least one group of session parameters that the CSI request apparatus expects to use, so as to improve a probability that the first CSI response apparatus successfully responds to a request of the first CREQ frame.

For example, the capability parameter of the first CSI response apparatus includes that a currently supported PPDU format is an HT-MF format, a quantity of transmit antennas is 4, and a transmission bandwidth is 40 MHz. In this case, when determining a session parameter that the CSI request apparatus expects to use, the CSI request apparatus may determine at least one group of session parameters in which a format of a CS frame is the HT-MF format, a quantity of transmit antennas is not greater than 4, and a transmission bandwidth is not greater than 40 MHz.

In an example, when the CSI request apparatus receives broadcast frames that are sent by multiple CSI response apparatuses and that carry CRC information elements, the CSI request apparatus may further determine, in the multiple CSI response apparatuses according to the CRC information elements in the multiple broadcast frames, at least one first CSI response apparatus whose capability parameter satisfies a requirement of the CSI request apparatus for transmitting the CS frame.

For example, the CSI request apparatus receives, by using the active scanning manner or the passive scanning manner, two broadcast frames carrying CSI responder capability indication information. It is assumed that the CSI request apparatus determines, by using CRC information elements in the two broadcast frames, that a first CSI response apparatus supports eight transmit antennas, and a second CSI response apparatus supports two transmit antennas. It is assumed that the requirement of the CSI request apparatus for transmitting the CS frame is to preferentially select a session parameter that can provide measurement of a higher channel dimension. When a quantity of transmit antennas is larger, a channel dimension of the CSI measured by the CSI request apparatus is higher. Therefore, the first response apparatus is a first CSI response apparatus that satisfies the requirement of the CSI request apparatus for transmitting the CS frame, so that the CSI request apparatus can further send the first CREQ frame to the first CSI response apparatus.

Optionally, the broadcast frame may be a beacon (beacon) frame, or may be a public action frame that is used to advertise the CSI responder capability and that is provided in this embodiment of the present invention. The public action frame may be referred to as a CSI responder advertisement (CSI Responder Advertisement, CRA) frame.

In an example, if the first CSI response apparatus is an AP device, the first CSI response apparatus may advertise, by periodically broadcasting a beacon frame that carries the CSI responder capability indication information, that the first CSI response apparatus has the CSI responder capability.

Figure 11:
FIG. 11 is a schematic structural diagram of an extended capabilities information element (Extended Capabilities element) provided in the IEEE 802.11 standards.

For example, in the 802.11 standards, the beacon frame includes an extended capabilities information element (Extended Capabilities element), and as shown in FIG. 11, includes an element identifier (Element ID) field, a length (length) field, and a capabilities (Capabilities) field. The capabilities field includes some capability indication bits defined in the 802.11 standards. These indication bits are used to advertise some special capabilities of a device that sends the beacon frame, for example, a fine time measurement responder (FTM Responder) capability.

In this embodiment of the present invention, a "CSI responder" capability indication bit may be added to the capability field of the extended capabilities information element of the beacon frame, and is used to advertise that the CSI response apparatus that sends the beacon frame has the CSI responder capability. For example, when the "CSI responder" capability indication bit is set to 1, it represents that the first CSI response apparatus that periodically broadcasts the beacon frame has the CSI responder capability.

Further, the CRC information element may further be carried in a field that is in the beacon frame and that is used to store extended information, so as to explicitly point out the capability parameter of the first CSI response apparatus.

Figure 12:
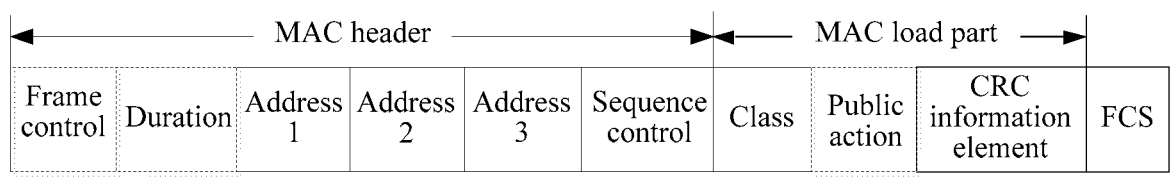
FIG. 12 is a schematic structural diagram of a CRA frame according to an embodiment of the present invention.

In an example, if the first CSI response apparatus is not an AP device, that is, the first CSI response apparatus cannot broadcast a beacon frame, the first CSI response apparatus may broadcast a CRA frame. Specifically, FIG. 12 shows a format of a CRA frame according to an embodiment of the present invention. The format of the CRA includes a MAC header and a MAC load part.

The MAC header of the CRA frame may be designed following a regulation of a public action frame in the 802.11 standards. For example, the MAC header of the CRA frame may include a frame control field, a duration (Duration) field, an address 1 field, an address 2 field, an address 3 field, and a sequence control field. The frame control field may include a series of indication bits used to indicate information such as a protocol version used by the CRA frame, a frame type, a frame subtype, whether more packet fragments are included, and whether an encryption mechanism is used. The duration field is used to indicate a channel time that needs to be occupied to transmit the CRA frame. The address 1 field is used to indicate a destination MAC address of the CRA frame, and in this embodiment of the present invention, may be set as a MAC broadcast address, representing that the CRA frame is a broadcast frame. The address 2 field is used to indicate a MAC address of a sender of the CRA frame, and in this embodiment of the present invention, may be set as a MAC address of the first CSI response apparatus. The address 3 field may be set as a wildcard BSSID. The sequence control field is used to detect a repetitive frame, and every time the CSI response apparatus sends one CRA frame, the value of the field increases by 1.

The MAC load part of the CRA frame includes a class field, a public action field, a CRC information element field, and an FCS field.

The class field is used to indicate a specific action frame that the CRA frame provided in this embodiment of the present invention is. The CRA frame is a public action frame. Therefore, according to a definition of a format of an action frame in the 802.11 standards, a value of the class field may be set to 4, representing that the CRA frame is a public action frame.

The public action field is used to indicate a specific public action frame that the public action frame is. In this embodiment of the present invention, the public action field may be set to a value corresponding to the CRA frame, representing that the public action frame is a CRA frame. A value that can be different from a value corresponding to a currently existing public action frame may be used to represent the CRA frame.

The CRC information element field is used to store the capability parameter of the first CSI response apparatus.

The FCS field is used to check the CRA frame. A definition of the FCS field and a method for generating the FCS field may follow the existing 802.11 standards.

Optionally, in the preferred procedure, the CSI request apparatus may send the first CREQ frame to an explicit request target, that is, the first CSI response apparatus by using a unicast manner, so that the first CSI response apparatus can perform a CSI measurement session with the CSI request apparatus. Therefore, after receiving the CRSP frame sent by the first CSI response apparatus and determining the first session parameter, the CSI request apparatus may send the third CREQ frame to the first CSI response apparatus at the beginning of each burst period regulated in the first session parameter, to instruct the first CSI response apparatus to start to periodically send the CS frame within a current burst period after the first CSI response apparatus receives the third CREQ frame, so that the first CSI response apparatus starts, as instructed by the CSI request apparatus, to send the CS frame.

Optionally, in the preferred procedure, the CSI request apparatus may send the first CREQ frame to an explicit request target, that is, the first CSI response apparatus by using a unicast manner. Therefore, if the first CSI response apparatus determines that a session parameter that satisfies the capability parameter of the first CSI response apparatus does not exist in the at least one group of session parameters that the CSI request apparatus expects to use, the first CSI response apparatus may add failure indication information to a CRSP, where the failure indication information is used to indicate that a request of the first CREQ frame fails. Therefore, the CSI request apparatus may request in time another CSI response apparatus to perform a CSI measurement session with the CSI request apparatus.

In an example, a request result indication bit may be set in a load part of the CRSP frame, and different values are used to represent the success indication information and the failure indication information.

For example, when the first CSI response apparatus determines that the first session parameter exists, the first CSI response apparatus sets a value of the request result indication bit to 1 to represent the success indication information, and adds the first session parameter to the load part of the CRSP frame and sends the CRSP frame to the CSI request apparatus, so that after receiving the CRSP frame, the CSI request apparatus can determine that the request of the first CREQ frame succeeds, and prepare to receive, according to the first session parameter, the CS frame sent by the first CSI response apparatus.

When the first CSI response apparatus determines that a session parameter that satisfies a current capability parameter of the first CSI response apparatus does not exist in the at least one group of session parameters, the first CSI response apparatus may set the value of the request result indication bit to 0 to represent the failure indication information, and send the request result indication bit to the CSI request apparatus, to indicate that the request of the first CREQ frame fails. Therefore, the CSI request apparatus may send the first CREQ frame to another CSI response apparatus in time, to request the another CSI response apparatus to perform a CSI measurement session with the CSI request apparatus.

Figure 13:
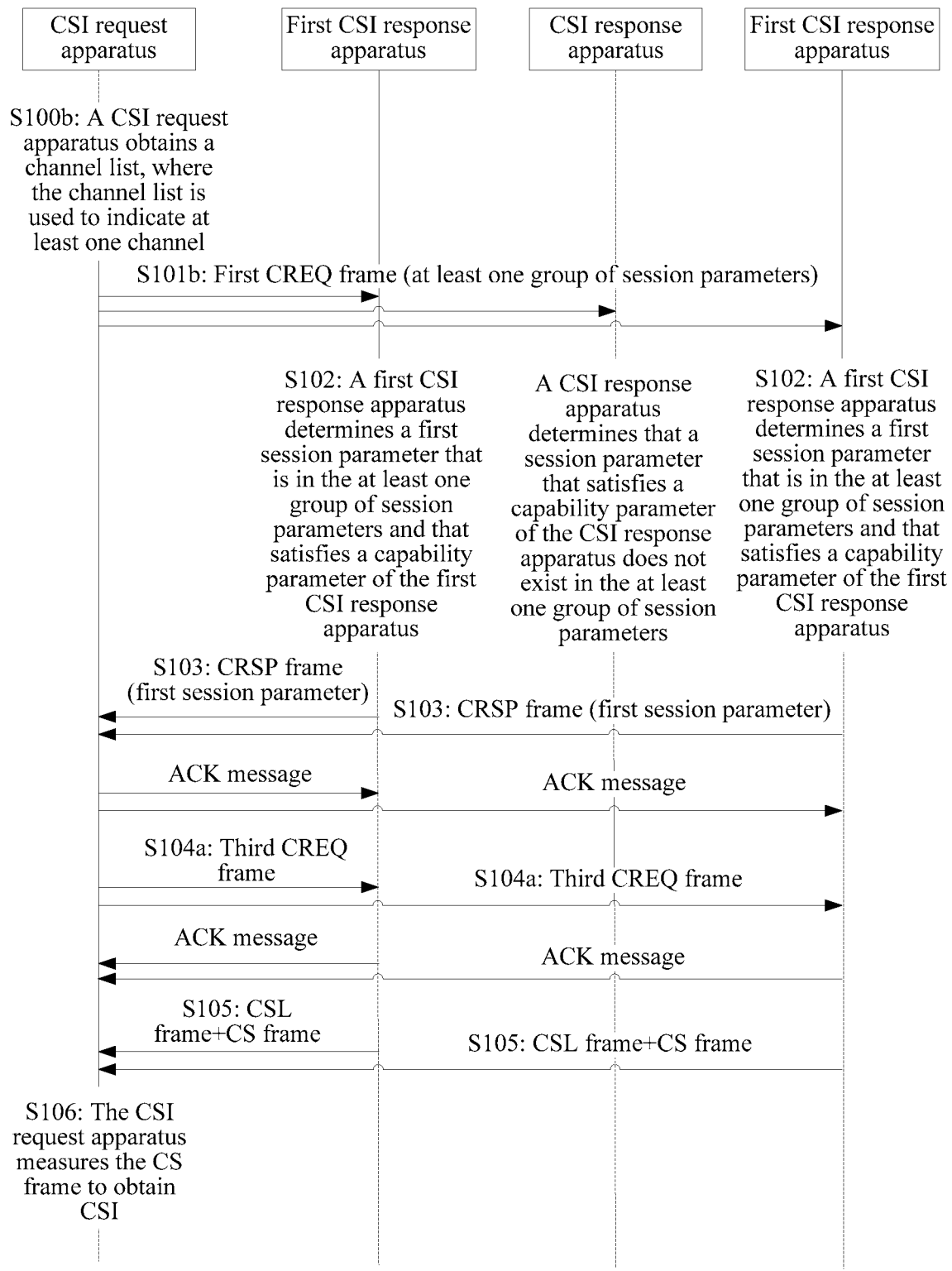
FIG. 13 is a fourth interaction diagram of another CSI measurement method according to an embodiment of the present invention.

Optionally, based on the foregoing method shown in FIG. 8 and FIG. 9, this embodiment of the present invention further provides another preferred procedure of the CSI measurement method. Specifically, with reference to FIG. 8, as shown in FIG. 13, before S101, the method may further include:

S100*b*: The CSI request apparatus obtains a channel list, where the channel list is used to indicate at least one channel.

The channel list may be delivered to the CSI request apparatus by an application that runs on the CSI request apparatus and that needs to obtain the CSI. The channel list may include channel information of each channel to be scanned. The CSI request apparatus may broadcast, according to the channel list, the first CREQ frame on each channel that appears in the channel list.

In this case, in the preferred procedure, the foregoing S101 may specifically include:

S101b: The CSI request apparatus broadcasts the first CREQ frame on the at least one channel.

In this embodiment of the present invention, after the CSI request apparatus broadcasts the first CREQ frame on the at least one channel, each CSI response apparatus that receives the first CREQ frame may determine, according to the method in the foregoing S102 and S103, whether a session parameter satisfied by a capability parameter of the CSI response apparatus exists in the at least one group of session parameters carried in the first CREQ frame, and when a session parameter satisfied by the capability parameter exists, add the session parameter to a CRSP frame and send the CRSP frame to the CSI request apparatus. If a session parameter satisfied by the capability parameter of the CSI response apparatus does not exist in the at least one group of session parameters, the CSI response apparatus may end a current procedure.

Specifically, in this embodiment of the present invention, the CSI request apparatus may broadcast the first CREQ frame on the at least one channel according to a requirement that the CSI request apparatus needs to obtain the CSI and by using various manners.

For example, it is assumed that the CSI request apparatus needs to obtain CSI between the CSI request apparatus and three different CSI response apparatuses. The channel list includes channel information of three channels. In this case, the CSI request apparatus may first broadcast the first CREQ frame on a channel corresponding to a first number. If the CSI request apparatus already receives, by using the channel, CRSP frames sent by the three CSI response apparatuses, the CSI request apparatus may directly use the three CSI response apparatuses as first CSI response apparatuses and perform a subsequent CSI measurement procedure, but does not need to broadcast the first CREQ frame on two channels corresponding to the other two numbers. If the CSI request apparatus does not receive a CRSP frame or does not receive three CRSP frames, the CSI request apparatus may continue to broadcast the first CREQ frame on a channel corresponding to a second number.

Optionally, the CSI request apparatus may broadcast the first CREQ frame on the three channels one by one and receive CRSP frames returned by CSI response apparatuses on the channels, until broadcast of a CREQ frame and reception of a CRSP frame are completed on a last channel. After receiving, by using the three channels, CRSP frames sent by multiple CSI response apparatuses, the CSI request apparatus may select, from the multiple CSI response apparatuses according to the requirement of the CSI request apparatus, three CSI response apparatuses as first CSI response apparatuses, and perform a subsequent CSI measurement procedure with the three first CSI response apparatuses.

Specifically, regardless of which manner the CSI request apparatus uses to broadcast the first CREQ frame, the CSI request apparatus may receive CRSP frames that are sent by the multiple CSI response apparatuses to the CSI request apparatus and that exceed the requirement of the CSI request apparatus. In this case, in this preferred procedure, the CSI request apparatus may determine at least one first CSI response apparatus in the multiple CSI response apparatuses, and instruct the at least one first CSI response apparatus to send a CS frame, so as to obtain CSI between the CSI request apparatus and the at least one first CSI response apparatus, and other CSI response apparatuses that are not instructed may not send a CS frame. That is, in the preferred procedure, the foregoing S104 may specifically include:

S104a: The CSI request apparatus may use a first session parameter that is separately negotiated by the CSI request apparatus and at least one first CSI response apparatus, and at the beginning of each burst period regulated in each first session parameter, separately send the third CREQ frame to the corresponding first CSI response apparatus, to trigger the corresponding first CSI response apparatus to separately start to periodically send a CS frame within a current burst period of the corresponding first CSI response apparatus.

Specifically, after the CSI request apparatus receives CRSP frames sent by multiple CSI response apparatuses, the CSI request apparatus may randomly select at least one CSI response apparatus from the multiple CSI response apparatuses as the first CSI response apparatus, or may determine at least one first CSI response apparatus in the multiple CSI response apparatuses according to expected values of the CSI request apparatus for session parameters selected by the multiple CSI response apparatuses. For example, the CSI request apparatus needs to obtain CSI of three CSI response apparatuses. The CSI request apparatus may select three CSI response apparatuses having the maximum expected values in the session parameters selected by the multiple CSI response apparatuses as first CSI response apparatuses.

It should be noted that, based on the CSI measurement method provided in this embodiment of the present invention and various preferred procedures of the method, this embodiment of the present invention provides a CREQ frame, a MAC load part may not carry at least one group of session parameters, but instead, carry only sending instruction information or termination instruction information. After the CSI request apparatus and the first CSI response apparatus determine the first session parameter, the CSI request apparatus adds the sending instruction information to the CREQ frame, to instruct the first CSI response apparatus to start to send a CS frame in a new burst period in a current CSI measurement session. Alternatively, the CSI request apparatus adds the stop instruction information to the CREQ frame, to instruct the first CSI response apparatus to terminate a current CSI measurement session.

In an example, a trigger (tigger) indication bit may be set, and different values are used to represent the sending instruction information and the termination instruction information. For example, when tigger=1, the CREQ frame is used to instruct the first CSI response apparatus to start to periodically send the CS frame within a current burst period regulated in the first session parameter. When tigger=0, the CREQ frame is used to instruct the first CSI response apparatus to terminate the current CSI measurement session.

For example, with reference to the foregoing CREQ frames used in the embodiments shown in FIG. 8 to FIG. 10 and FIG. 13, when the CREQ frame carries at least one group of session parameters, the CREQ frame is the first CREQ frame. The first CREQ frame is used to request a CSI response apparatus that receives the first CREQ frame to determine, in the at least one group of session parameters carried in the first CREQ frame, a group of session parameters used to transmit the CS frame. When the CREQ frame provided in this embodiment of the present invention does not carry at least one group of session parameters, if tigger=0, the CREQ frame is the second CREQ frame, and if tigger=1, the CREQ frame is the third CREQ frame.

Based on the CSI measurement method provided in this embodiment of the present invention, when the CSI request apparatus needs to obtain the CSI between the CSI request apparatus and the first CSI response apparatus, the CSI request apparatus and the first CSI response apparatus can negotiate session parameters by using the first CREQ frame and the CRSP frame, determine the first session parameter that the CSI request apparatus expects to use and that can be satisfied by the capability parameter of the first CSI response apparatus, and transmit the CS frame by using the first session parameter, so that the CSI request apparatus measures the CS frame to obtain the CSI between the CSI request apparatus and the first CSI response apparatus. In a process of obtaining the CSI, the CSI request apparatus does not need to join a network of the first CSI response apparatus. Therefore, bandwidth overheads of the CSI request apparatus and the first CSI response apparatus are reduced, and a time delay of obtaining the CSI by the CSI request apparatus is reduced.

Finally, to make it convenient for an application program, for example, a positioning application program that runs on the CSI request apparatus to use the CSI measurement method provided in the present invention, the CSI request apparatus may provide a CSI measurement service access interface. The application program may import, by using the CSI measurement service access interface, at least one group of session parameters that the application program expects to use in a CSI measurement session, and another control message related to CSI measurement, for example, the channel list used in S100b in the preferred procedure of the foregoing CSI measurement method. Moreover, CSI information that is obtained by the CSI request apparatus in the CSI measurement session and that is between the CSI request apparatus and a corresponding CSI response apparatus may alternatively be described by using a 2-tuple form <MAC address of CSI response apparatus, CSI matrix array>, and may be returned to the application program by using the CSI measurement service access interface. For a specific description form of the CSI matrix array, a definition of a CSI matrix in the 802.11 standards may be used. It should be particularly noted that the CSI request apparatus may obtain one CSI matrix array in the CSI measurement session every time the CSI request apparatus receives a CS frame sent by the CSI response apparatus, and every time the CSI request apparatus obtains one CSI matrix array, the CSI request apparatus may immediately return the CSI matrix array in the 2-tuple form to the application program by using the CSI measurement service access interface.

The solutions provided in the embodiment of the present invention are mainly described above from the perspective of interaction between network elements. It may be understood that, to implement the foregoing functions, the network elements, for example, the CSI request apparatus and the CSI response apparatus include hardware structures and/or software modules corresponding to the execution of various functions. A person skilled in the art should be easily aware that, in combination with the examples described in the embodiments disclosed in this specification, units and algorithm steps may be implemented by a combination of hardware and computer software in the present invention. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, functional modules of the CSI request apparatus and the CSI response apparatus may be divided according to the foregoing examples of methods. For example, various functions may be correspondingly allocated to various functional modules, or two or more functions may be integrated into one processing module. The foregoing integrated module may be implemented in the form of hardware or in the form of software functional modules. It should be noted that, the division of modules in this embodiment of the present invention is an example, and is merely logical functional division, and there may be other division manners in actual implementation.

Figure 14A:
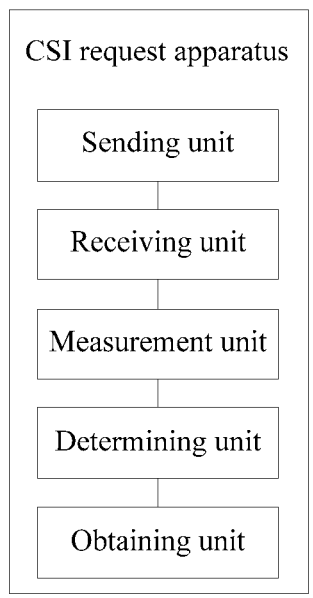
FIG. 14A is a second schematic structural diagram of a CSI request apparatus according to an embodiment of the present invention.

When various functions are correspondingly allocated to various functional modules, FIG. 14A is a possible schematic structural diagram of the CSI request apparatus used in the foregoing embodiment. The CSI request apparatus includes a sending unit, a receiving unit, a measurement unit, a determining unit, and an obtaining unit. The sending unit is configured to provide support for the CSI request apparatus to perform the processes S101 and S104 in FIG. 8, the processes S101, S104, and S106 in FIG. 9, the processes S101a and S104 in FIG. 10, and the processes S101b and S104a in FIG. 13, and send an ACK message to the CSI response apparatus. The receiving unit is configured to provide support for the CSI request apparatus to perform the processes S103 and S105 in FIG. 8 and FIG. 9, the processes S100a, S103, and S105 in FIG. 10, and the processes S103 and S105 in FIG. 13, and receive an ACK message sent by the CSI response apparatus. The measurement unit is configured to provide support for the CSI request apparatus to perform the process S106 in FIG. 8, FIG. 9, FIG. 10, and FIG. 13. The determining unit is configured to provide support for the CSI request apparatus to perform a process of determining at least one group of session parameters that the CSI request apparatus expects to use, a process of determining, in multiple CSI response apparatuses, at least one first CSI response apparatus whose capability parameter satisfies a requirement of the CSI request apparatus for transmitting a CS frame, and a process of determining the at least one first CSI response apparatus in the multiple CSI response apparatuses according to expected values of the CSI request apparatus for session parameters selected by the multiple CSI response apparatuses. The obtaining unit is configured to provide support for the CSI request apparatus to perform the process S100b in FIG. 13. All related content of the steps used in the foregoing method embodiments may be cited in functional descriptions of corresponding functional modules, and details are not described herein.

Figure 14B:
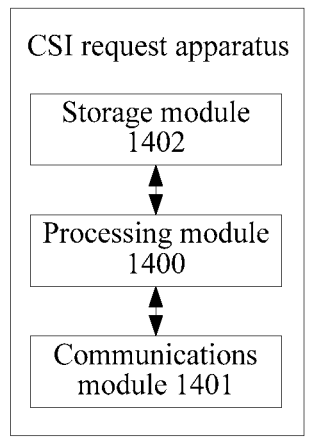
FIG. 14B is a third schematic structural diagram of a CSI request apparatus according to an embodiment of the present invention.

When an integrated unit is used, FIG. 14B is a possible schematic structural diagram of the CSI request apparatus used in the foregoing embodiment. The CSI request apparatus includes: a processing module 1400 and a communications module 1401. The processing module 1400 is configured to perform control management on an action of the CSI request apparatus. For example, the processing module 1400 is configured to provide support for the CSI request apparatus to perform the processes S101, S103, S104, S105, and S106 in FIG. 8, the processes S101, S103, S104, S105, and S106 in FIG. 9, the processes S100a, S101a, S103, S104, S105, and S106 in FIG. 10, and the processes S100b, S101b, S103, S104, S105, and S106 in FIG. 13, and/or is configured to perform another process in the technology described herein. The communications module 1401 is configured to provide support for the CSI request apparatus to communicate with another network entity, for example, communicate with a functional module or a network entity in FIG. 1. The CSI request apparatus may further include a storage module 1402 configured to store program code and data of the CSI request apparatus.

The processing module 1400 may be a processor or a controller, for example, may be a central processing unit (Central Processing Unit, CPU), a general-purpose processor, a digital signal processor (Digital Signal processor, DSP), an application-specific integrated circuit (Application-Specific Integrated Circuit, ASIC), a field programmable gate array (Field Programmable Gate Array, FPGA) or another programmable logic device, a transistor logic device, a hardware component or any combination thereof. The controller/processor can implement or perform various examples of logic blocks, modules, and circuits described with reference to content disclosed in the present invention. The processor may be a combination that implements a computing function, for example, including one microprocessor or a combination of multiple microprocessors, or a combination of a DSP and a microprocessor. The communications module 1401 may be a transceiver, a transceiver circuit, a communications interface, or the like. The storage module 1402 may be a memory.

Figure 14C:
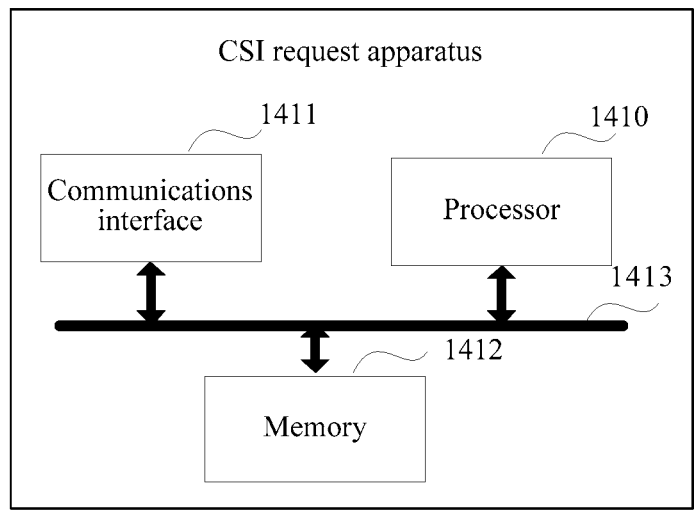
FIG. 14C is a fourth schematic structural diagram of a CSI request apparatus according to an embodiment of the present invention.

When the processing module 1400 is a processor, the communications module 1401 is a communications interface, and the storage module 1402 is a memory, the CSI request apparatus used in this embodiment of the present invention may be the CSI request apparatus shown in FIG. 14C.

Referring to FIG. 14C, the CSI request apparatus includes: a processor 1410, a communications interface 1411, a memory 1412, and a bus 1413. The communications interface 1411, the processor 1410, and the memory 1412 are connected to each other by using the bus 1413. The bus 1413 may be a Peripheral Component Interconnect (Peripheral Component Interconnect, PCI) standard bus or an extended industry standard architecture (Extended Industry Standard Architecture, EISA) bus, and the like. The bus may be classified into an address bus, a data bus, a control bus, and the like. For convenience of representation, only one bold line is used for representation in FIG. 14, but this does not represent that there is only one bus or one type of bus.

Figure 15A:
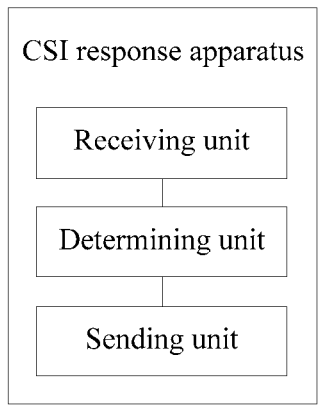
FIG. 15A is a second schematic structural diagram of a CSI response apparatus according to an embodiment of the present invention.

When various functions are correspondingly allocated to various functional modules, FIG. 15A is a possible schematic structural diagram of the CSI response apparatus used in the foregoing embodiments. The CSI response apparatus includes: a receiving unit, a sending unit, and a determining unit. The receiving unit is configured to provide support for the CSI response apparatus to perform the processes S101 and S104 in FIG. 8, the processes S101, S104, and S106 in FIG. 9, the processes S101*a* and S104 in FIG. 10, and the processes S101*b* and S104*a* in FIG. 13. The sending unit is configured to provide support for the CSI response apparatus to perform the processes S103 and S105 shown in FIG. 8 and FIG. 10, the processes S100*a*, S103, and S105 in FIG. 9, and the processes S103 and S105 in FIG. 13. The determining unit is configured to provide support for the CSI response apparatus to perform the process S102 in FIG. 8 to FIG. 10 and FIG. 13. All related content of the steps used in the foregoing method embodiments may be cited in functional descriptions of corresponding functional modules, and details are not described herein.

Figure 15B:
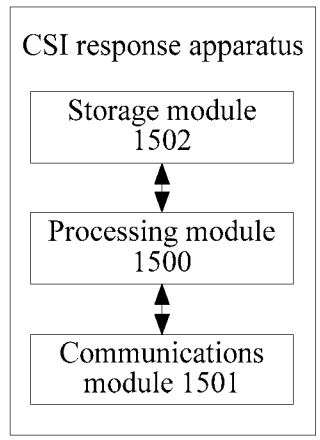
FIG. 15B is a third schematic structural diagram of a CSI response apparatus according to an embodiment of the present invention.

When an integrated unit is used, FIG. 15B is a possible schematic structural diagram of the CSI response apparatus used in the foregoing embodiment. The CSI response apparatus includes: a processing module 1500 and a communications module 1501. The processing module 1500 is configured to perform control management on an action of the CSI response apparatus. For example, the processing module 1500 is configured to provide support for the CSI response apparatus to perform the processes S101, S103, S104, and S105 in FIG. 8, the processes S100*a*, S101, S103, S104, S105, and S106 in FIG. 9, the processes S101*a* and S104 in FIG. 10, and the processes S100*b*, S101*b*, S103, S105, and S104*a* in FIG. 13, and/or is configured to perform another process in the technology described herein. The communications module 1501 is configured to provide support for the CSI response apparatus to communicate with another network entity, for example, communicate with a functional module or a network entity in FIG. 1. The CSI response apparatus may further include a storage module 1502 configured to store program code and data of the CSI response apparatus.

The processing module 1500 may be a processor or a controller, for example, may be a CPU, a general-purpose processor, a DSP, an ASIC, an FPGA or another programmable logic device, a transistor logic device, a hardware component or any combination thereof. The controller/processor can implement or perform various examples of logic blocks, modules, and circuits described with reference to content disclosed in the present invention. The processor may also be a combination that implements a computing function, for example, including one microprocessor or a combination of multiple microprocessors, or a combination of a DSP and a microprocessor. The communications module 1501 may be a communications interface, a transceiver circuit, a communications interface or the like. The storage module 1502 may be a memory.

When the processing module 1500 is a processor, the communications module 1501 is a communications interface, and the storage module 1502 is a memory, the CSI response apparatus used in this embodiment of the present invention may be the CSI response apparatus shown in FIG. 13C.

Figure 15C:
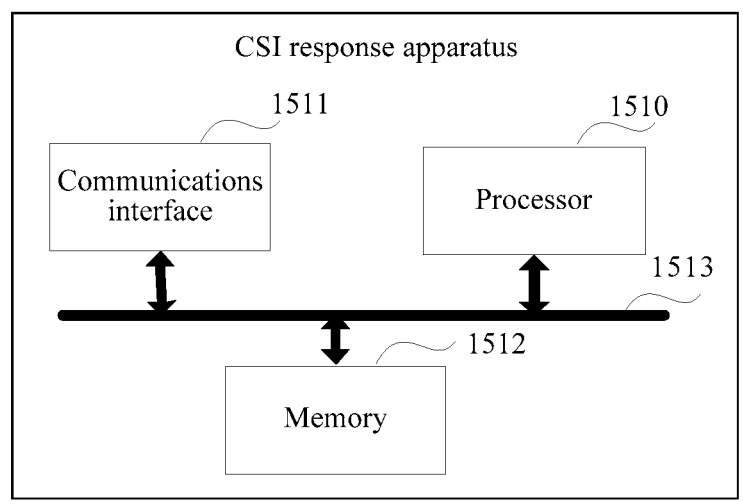
FIG. 15C is a fourth schematic structural diagram of a CSI response apparatus according to an embodiment of the present invention.

Referring to FIG. 15C, the CSI response apparatus includes: a processor 1510, a communications interface 1511, a memory 1512, and a bus 1513. The communications interface 1511, the processor 1510, and the memory 1512 are connected to each other by using the bus 1513. The bus 1513 may be a PCI bus, an EISA bus, or the like. The bus may be classified into an address bus, a data bus, a control bus, and the like. For ease of representation, only one bold line is used to represent the bus in FIG. 15C, but this does not mean that there is only one bus or only one type of bus.

Method or algorithm steps described in combination with the content disclosed in the present invention may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A channel state information (CSI) measurement method, wherein the method comprises:
   sending, by a first wireless device, a first channel state information request (CREQ) frame, wherein the first CREQ frame comprises at least one group of session parameters to be used by the first wireless device to receive a channel state information sounding (CS) frame, and wherein each group of session parameters of the at least one group of session parameters comprises a parameter indicating a quantity of transmit antennas to be used to transmit the CS frame, and the CS frame is used by the first wireless device to perform channel state measurement;
   receiving, by the first wireless device, a channel state information response (CRSP) frame sent by a second wireless device, wherein the CRSP frame comprises a first session parameter, the first session parameter is a group of session parameters that is of the at least one group of session parameters and that is satisfied by a capability parameter of the second wireless device, and wherein the capability parameter of the second wireless device comprises a number of transmit antennas supported by the second wireless device, and the CRSP frame indicates that the quantity of transmit antennas of the first session parameter is satisfied by the number of transmit antennas supported by the second wireless device, and wherein the CRSP frame is different from the CS frame, and the CRSP frame sent by the second wireless device indicates the quantity of transmit antennas that is used by the second wireless device to transmit the CS frame;
   after receiving the CRSP frame, receiving, by the first wireless device and by using the first session parameter, the CS frame sent by the second wireless device; and
   measuring, by the first wireless device, the CS frame to obtain CSI.

2. The method according to claim 1, wherein
   each group of session parameters of the at least one group of session parameters comprises a transmission parameter and a scheduling parameter;
   the transmission parameter comprises one or more parameters of:
   a physical-layer protocol data unit (PPDU) format of the CS frame, channel information, a transmission bandwidth, a modulation and coding scheme, or a set of transmit antennas used during transmission of the CS frame; and
   the scheduling parameter comprises at least one of:
   a burst period of sending the CS frame, a quantity of burst periods, a busy period of sending the CS frame within the burst period, or a time interval of sending the CS frame in the busy period.

3. The method according to claim 2, wherein
   a PPDU of the CS frame is a PPDU that corresponds to a PPDU format comprised in the first session parameter and in which a length of a physical-layer service data unit (PSDU) is 0; and
   the measuring the CS frame to obtain CSI comprises:
   measuring a preamble sequence of the CS frame to obtain the CSI.

4. The method according to claim 2, wherein before a CSI measurement session defined in the first session parameter ends, the method further comprises:
   sending, by the first wireless device, a second CREQ frame to the second wireless device, wherein the second CREQ frame instructs the second wireless device to terminate a current CSI measurement session and to stop sending the CS frame.

5. The method according to claim 1, wherein the sending a first CREQ frame comprises:
   sending the first CREQ frame to the second wireless device.

6. The method according to claim 5, wherein before the sending the first CREQ frame to the second wireless device, the method further comprises:
   receiving, by the first wireless device, a broadcast frame broadcast by the second wireless device, wherein the broadcast frame comprises CSI responder capability indication information, and the CSI responder capability indication information indicates that the second wireless device has a capability of sending the CS frame; and
   the sending the first CREQ frame to the second wireless device comprises:
   after the first wireless device determines, according to the CSI responder capability indication information, that the second wireless device has the capability of sending the CS frame, sending, by the first wireless device, the first CREQ frame to the second wireless device.

7. The method according to claim 6, wherein
   the broadcast frame further comprises a CSI responder capability (CRC) information element, wherein the CRC information element carries one or more capability parameters of:
   a PPDU format supported by the second wireless device, a transmission bandwidth, a modulation and coding scheme, a quantity of transmit antennas, or transmit antenna arrangement information of the second wireless device; and
   before the sending the first CREQ frame to the second wireless device, the method further comprises:
   determining, by the first wireless device, the at least one group of session parameters according to the capability parameter of the second wireless device.

8. The method according to claim 7, wherein before the sending the first CREQ frame to the second wireless device, the method further comprises:
   if the first wireless device receives broadcast frames broadcast by multiple wireless devices, determining, by the first wireless device, in the multiple wireless devices and according to CRC information elements of the multiple wireless devices, at least one second wireless device whose capability parameter satisfies a requirement of the first wireless device for transmitting the CS frame.

9. The method according to claim 1, wherein before the sending a first CREQ frame, the method further comprises:
obtaining, by the first wireless device, a channel list, wherein the channel list indicates at least one channel, and the at least one channel is used by the first wireless device to broadcast the first CREQ frame; and
the sending a first CREQ frame comprises:
broadcasting, by the first wireless device, the first CREQ frame on the at least one channel.

10. The method according to claim 9, wherein after the receiving a CRSP frame sent by the second wireless device, and before the receiving, by the first wireless device, the CS frame by using the first session parameter, the method further comprises:
sending, by the first wireless device, a third CREQ frame to the second wireless device, wherein the third CREQ frame requests the second wireless device to start to periodically send the CS frame within a current burst period.

11. The method according to claim 10, wherein before the sending a third CREQ frame to the second wireless device, the method further comprises:
if the first wireless device receives CRSP frames sent by multiple wireless devices, determining, by the first wireless device, at least one second wireless device in the multiple wireless devices according to expected values for session parameters selected by the multiple wireless devices.

12. A channel state information (CSI) measurement method, wherein the method comprises:
receiving, by a second wireless device, a first channel state information request (CREQ) frame sent by a first wireless device, wherein the first CREQ frame comprises at least one group of session parameters to be used by the first wireless device to receive a channel state information sounding (CS) frame, and wherein each group of session parameters of the at least one group of session parameters comprises a parameter indicating a quantity of transmit antennas to be used to transmit the CS frame, and the CS frame is used by the first wireless device to perform channel state sounding;
determining, by the second wireless device, a first session parameter that is in the at least one group of session parameters and that is satisfied by a capability parameter of the second wireless device, wherein the capability parameter of the second wireless device comprises a number of transmit antennas supported by the second wireless device;
sending, by the second wireless device, a channel state information response (CRSP) frame to the first wireless device, wherein the CRSP frame comprises the first session parameter, and the CRSP frame instructs the first wireless device to receive the CS frame by using the first session parameter, the CRSP frame indicates that the quantity of transmit antennas of the first session parameter is satisfied by the number of transmit antennas supported by the second wireless device, and wherein the CRSP frame is different from the CS frame, and the CRSP frame sent by the second wireless device indicates the quantity of transmit antennas that is used by the second wireless device to transmit the CS frame; and after sending the CRSP frame, sending, by the second wireless device, the CS frame by using the first session parameter.

13. The method according to claim 12, wherein each group of session parameters of the at least one group of session parameters comprises a transmission parameter and a scheduling parameter;
the transmission parameter comprises one or more parameters of:
a physical-layer protocol data unit (PPDU) format of the CS frame, channel information, a transmission bandwidth, a modulation and coding scheme, or a set of transmit antennas used during transmission of the CS frame; and
the scheduling parameter comprises at least one of:
a burst period of sending the CS frame, a quantity of burst periods, a busy period of sending the CS frame within the burst period, or a time interval of sending the CS frame in the busy period.

14. The method according to claim 12, wherein the capability parameter comprises one or more capability parameters of:
a PPDU format supported by the second wireless device, a transmission bandwidth, a modulation and coding scheme, a quantity of transmit antennas, transmit antenna arrangement information, a channel load condition detected by the second wireless device.

15. The method according to claim 12, wherein after the sending the CS frame by using the first session parameter, the method further comprises:
receiving, by the second wireless device, a second CREQ frame sent by the first wireless device, wherein the second CREQ frame instructs the second wireless device to terminate a current CSI measurement session and to stop sending the CS frame; and
according to the second CREQ frame, terminating, by the second wireless device, the current CSI measurement session and stopping sending the CS frame.

16. The method according to claim 12, wherein the receiving a first CREQ frame comprises:
receiving, by the second wireless device by using a unicast manner, the first CREQ frame sent by the first wireless device.

17. The method according to claim 16, wherein before the receiving a first CREQ frame, the method further comprises:
sending, by the second wireless device, a broadcast frame, wherein the broadcast frame comprises CSI responder capability indication information, and the CSI responder capability indication information indicates that the second wireless device has a CSI responder capability.

18. The method according to claim 17, wherein the broadcast frame further comprises a CSI responder capability (CRC) information element, wherein the CRC information element carries the capability parameter of the second wireless device.

19. The method according to claim 16, wherein if the second wireless device determines that a session parameter that satisfies the capability parameter does not exist in the at least one group of session parameters, including, by the second wireless device, failure indication information in the CRSP frame, wherein the failure indication information indicates that a request of the first CREQ frame fails.

20. The method according to claim 12, wherein
after the sending a CRSP frame to the first wireless device, and before the sending the CS frame by using the first session parameter, the method further comprises:
receiving, by the second wireless device, a third CREQ frame sent by the first wireless device, wherein the third CREQ frame requests the second wireless device to start to periodically send the CS frame within a current burst period; and
the sending the CS frame by using the first session parameter comprises:
sending the CS frame according to an indication of the third CREQ frame and by using the first session parameter.

21. A first wireless device, comprising:
a non-transitory memory storage comprising instructions; and
one or more hardware processors in communication with the non-transitory memory storage, wherein the one or more hardware processors execute the instructions to:
send a first channel state information request (CREQ) frame, wherein the first CREQ frame comprises at least one group of session parameters to be used by the first wireless device to receive a channel state information sounding (CS) frame, and wherein each group of session parameters of the at least one group of session parameters comprises a parameter indicating a quantity of transmit antennas to be used to transmit the CS frame, and the CS frame is used by the first wireless device to perform channel state measurement;
receive a channel state information response (CRSP) frame sent by a second wireless device, wherein the CRSP frame comprises a first session parameter, the first session parameter is a group of session parameters that is of the at least one group of session parameters and that satisfies a capability parameter of the second wireless device, and wherein the capability parameter of the second wireless device comprises a number of transmit antennas supported by the second wireless device, and the CRSP frame indicates that the quantity of transmit antennas of the first session parameter is satisfied by the number of transmit antennas supported by the second wireless device, and wherein the CRSP frame is different from the CS frame, and the CRSP frame sent by the second wireless device indicates the quantity of transmit antennas that is used by the second wireless device to transmit the CS frame;
after receiving the CRSP frame, receive, by using the first session parameter, the CS frame sent by the second wireless device; and
measure the CS frame to obtain CSI.

22. The first wireless device according to claim 21, wherein
each group of session parameters of the at least one group of session parameters comprises a transmission parameter and a scheduling parameter;
the transmission parameter comprises one or more parameters of:
a physical-layer protocol data unit (PPDU) format of the CS frame, channel information, a transmission bandwidth, a modulation and coding scheme, or a set of transmit antennas used during transmission of the CS frame; and the scheduling parameter comprises at least one of:
a burst period of sending the CS frame, a quantity of burst periods, a busy period of sending the CS frame within the burst period, or a time interval of sending the CS frame in the busy period.

23. The first wireless device according to claim 22, wherein
a PPDU of the CS frame is a PPDU that corresponds to a PPDU format comprised in the first session parameter and in which a length of a physical-layer service data unit (PSDU) is 0; and
the one or more hardware processors execute the instructions to measure a preamble sequence of the CS frame to obtain the CSI.

24. The first wireless device according to claim 22, wherein the one or more hardware processors execute the instructions to:
before a CSI measurement session defined in the first session parameter ends, send a second CREQ frame to the second wireless device, wherein the second CREQ frame instructs the second wireless device to terminate a current CSI measurement session and to stop sending the CS frame.

25. The first wireless device according to claim 21, wherein the one or more hardware processors execute the instructions to:
send the first CREQ frame to the second wireless device.

26. The first wireless device according to claim 25, wherein the one or more hardware processors execute the instructions to:
before sending the first CREQ frame to the second wireless device, receive a broadcast frame broadcast by the second wireless device, wherein the broadcast frame comprises CSI responder capability indication information, and the CSI responder capability indication information indicates that the second wireless device has a capability of sending the CS frame; and
after determining, according to the CSI responder capability indication information, that the second wireless device has the capability of sending the CS frame, send the first CREQ frame to the second wireless device.

27. The first wireless device according to claim 26, wherein
the broadcast frame further comprises a CSI responder capability CRC information element, the CRC information element carries one or more capability parameters of:
a PPDU format supported by the second wireless device, a transmission bandwidth, a modulation and coding scheme, a quantity of transmit antennas, or transmit antenna arrangement information of the second wireless device; and
the one or more hardware processors execute the instructions to:
before sending the first CREQ frame to the second wireless device, determine the at least one group of session parameters according to the capability parameter of the second wireless device.

28. The first wireless device according to claim 27, wherein the one or more hardware processors execute the instructions to:
before sending the first CREQ frame to the second wireless device, if the first wireless device receives broadcast frames broadcast by multiple wireless devices, determine, in the multiple wireless devices and according to CRC information elements of the multiple wireless devices, at least one second wireless device whose capability parameter satisfies a requirement of the first wireless device for transmitting the CS frame.

29. The first wireless device according to claim 21, wherein the one or more hardware processors execute the instructions to:
before sending the first CREQ frame, obtain a channel list, wherein the channel list indicates at least one channel, and the at least one channel is used by the first wireless device to broadcast the first CREQ frame; and
broadcast the first CREQ frame on the at least one channel.

30. The first wireless device according to claim 29, wherein the one or more hardware processors execute the instructions to:
after receiving the CRSP frame and before receiving the CS frame by using the first session parameter, send a third CREQ frame to the second wireless device, wherein the third CREQ frame requests the second wireless device to start to periodically send the CS frame within a current burst period.

31. The first wireless device according to claim 30, wherein the one or more hardware processors execute the instructions to:
before sending the third CREQ frame, if the first wireless device receives CRSP frames sent by multiple wireless devices, determine at least one second wireless devicein the multiple wireless devices according to expected values of the first wireless device for session parameters selected by the multiple wireless devices.

32. A second wireless device, comprising:
a non-transitory memory storage comprising instructions; and
one or more hardware processors in communication with the non-transitory memory storage, wherein the one or more hardware processors execute the instructions to:
receive a first channel state information request (CREQ) frame sent by a first wireless device, wherein the first CREQ frame comprises at least one group of session parameters to be used by the first wireless device to receive a channel state information sounding (CS) frame, and wherein each group of session parameters of the at least one group of session parameters comprises a parameter indicating a quantity of transmit antennas to be used to transmit the CS frame, and the CS frame is used by the first wireless device to perform channel state sounding;
determine a first session parameter that is in the at least one group of session parameters and that satisfies a capability parameter of the second wireless device, wherein the capability parameter of the second wireless device comprises a number of transmit antennas supported by the second wireless device;
send a channel state information response (CRSP) frame to the first wireless device, wherein the CRSP frame comprises the first session parameter, and the CRSP frame instructs the first wireless device to receive the CS frame by using the first session parameter; and wherein the CRSP frame indicates that the quantity of transmit antennas of the first session parameter is satisfied by the number of transmit antennas supported by the second wireless device, and wherein the CRSP frame is different from the CS frame, and the CRSP frame sent by the second wireless device indicates the quantity of transmit antennas that is used by the second wireless device to transmit the CS frame; and after sending the CRSP frame, send the CS frame by using the first session parameter.

33. The second wireless device according to claim 32, wherein
each group of session parameters of the at least one group of session parameters comprises a transmission parameter and a scheduling parameter;
the transmission parameter comprises one or more parameters of:
a physical-layer protocol data unit (PPDU) format of the CS frame, channel information, a transmission bandwidth, a modulation and coding scheme, or a set of transmit antennas used during transmission of the CS frame; and
the scheduling parameter comprises at least one of:
a burst period of sending the CS frame, a quantity of burst periods, a busy period of sending the CS frame within the burst period, or a time interval of sending the CS frame in the busy period.

34. The second wireless device according to claim 32, wherein
the capability parameter comprises one or more capability parameters of:
a PPDU format supported by the second wireless device, a transmission bandwidth, a modulation and coding scheme, a quantity of transmit antennas, transmit antenna arrangement information, or a channel load condition detected by the second wireless device.

35. The second wireless device according to claim 32, wherein the one or more hardware processors execute the instructions to:
after sending the CS frame by using the first session parameter, receive a second CREQ frame sent by the first wireless device, wherein the second CREQ frame instructs the second wireless device to terminate a current CSI measurement session and to stop sending the CS frame; and
according to the second CREQ frame, terminate the current CSI measurement session and stop sending the CS frame.

36. The second wireless device according to claim 32, wherein the one or more hardware processors execute the instructions to:
receive, by using a unicast manner, the first CREQ frame sent by the first wireless device.

37. The second wireless device according to claim 36, wherein the one or more hardware processors execute the instructions to:
before receiving the first CREQ frame, send a broadcast frame, wherein the broadcast frame comprises CSI responder capability indication information, and the CSI responder capability indication information indicates that the second wireless device has a CSI responder capability.

38. The second wireless device according to claim 37, wherein
the broadcast frame further comprises a CSI responder capability CRC information element, the CRC information element carries the capability parameter of the second wireless device.

39. The second wireless device according to claim 36, wherein the one or more hardware processors execute the instructions to:
if the second wireless device determines that a session parameter that satisfies the capability parameter does not exist in the at least one group of session parameters, include failure indication information in the CRSP frame, wherein the failure indication information indicates that a request of the first CREQ frame fails.

40. The second wireless device according to claim 32, wherein the one or more hardware processors execute the instructions to:

after sending the CRSP frame to the first wireless device, and before sending the CS frame by using the first session parameter, receive a third CREQ frame sent by the first wireless device, wherein the third CREQ frame requests the second wireless device to start to periodically send the CS frame within a current burst period; and periodically sending the CS frame within the current burst period according to an indication of the third CREQ frame and by using the first session parameter.

* * * * *

UNITED STATES PATENT AND TRADEMARK OFFICE
CERTIFICATE OF CORRECTION

PATENT NO. : 11,398,877 B2
APPLICATION NO. : 16/394480
DATED : July 26, 2022
INVENTOR(S) : Zhihao Xing It is certified that error appears in the above-identified patent and that said Letters Patent is hereby corrected as shown below:

In the Specification

In Column 1, Line 11, Delete "2016," and insert -- 2016. --.

In the Claims

In Column 43, Line 27-28, In Claim 31, delete "devicein" and insert -- device in --.

Signed and Sealed this
Twenty-fifth Day of June, 2024

Katherine Kelly Vidal
*Director of the United States Patent and Trademark Office*